US009734352B2

(12) United States Patent
Huang et al.

(10) Patent No.: US 9,734,352 B2
(45) Date of Patent: Aug. 15, 2017

(54) DATA PROTECTION BASED ON USER AND GESTURE RECOGNITION

(71) Applicants: MICROSOFT TECHNOLOGY LICENSING, LLC, Redmond, WA (US); Jerry Huang, Redmond, WA (US); Zhen Liu, Tarrytown, NY (US); QingHu Li, Beijing (CN); Chen Liu, Beijing (CN)

(72) Inventors: Jerry Huang, Redmond, WA (US); Zhen Liu, Tarrytown, NY (US); QingHu Li, Beijing (CN); Chen Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 295 days.

(21) Appl. No.: 14/403,024

(22) PCT Filed: Jun. 27, 2014

(86) PCT No.: PCT/CN2014/080944
§ 371 (c)(1),
(2) Date: Nov. 21, 2014

(87) PCT Pub. No.: WO2015/196448
PCT Pub. Date: Dec. 30, 2015

(65) Prior Publication Data
US 2016/0371504 A1    Dec. 22, 2016

(51) Int. Cl.
*G06F 21/74*    (2013.01)
*G06F 21/62*    (2013.01)
(Continued)

(52) U.S. Cl.
CPC .......... *G06F 21/6245* (2013.01); *G06F 21/74* (2013.01); *G06F 21/84* (2013.01);
(Continued)

(58) Field of Classification Search
None
See application file for complete search history.

(56) References Cited

U.S. PATENT DOCUMENTS 6,002,427 A    12/1999    Kipust
6,480,096 B1    11/2002    Gutman et al.
(Continued)

FOREIGN PATENT DOCUMENTS

CN    101026822 A    8/2007
CN    101470787 A    7/2009
CN    103729363 A    4/2014

OTHER PUBLICATIONS

Liu, et al., "System for Context-Based Data Protection", U.S. Appl. No. 14/402,280, 55 pages.
(Continued)

*Primary Examiner* — Trang Doan
(74) *Attorney, Agent, or Firm* — Fiala & Weaver P.L.L.C.

(57) ABSTRACT

A computing device is described herein that automatically enters a data protection mode in response to determining that a certain number of persons are located proximate to the computing device, that an owner or authorized user is not located proximate to the computing device, or that a certain user gesture has or has not been recognized. When the device enters the data protection mode, sensitive data stored on the device is automatically rendered invisible and/or inaccessible to a user thereof. The sensitive data may be rendered invisible and/or inaccessible in a manner that is not likely to be apparent to the user of the computing device.

17 Claims, 11 Drawing Sheets

(51) Int. Cl.
  *G06F 21/84* (2013.01)
  *G06K 9/00* (2006.01)
  *H04N 7/18* (2006.01)
  *G06F 3/0484* (2013.01)

(52) U.S. Cl.
  CPC ..... *G06K 9/00255* (2013.01); *G06K 9/00295* (2013.01); *G06K 9/00335* (2013.01); *G06K 9/00362* (2013.01); *H04N 7/18* (2013.01); *G06F 3/04847* (2013.01); *G06F 2221/2143* (2013.01)

(56) References Cited

U.S. PATENT DOCUMENTS

| | | | |
|---|---|---|---|
| 8,050,698 B2* | 11/2011 | Seligmann | G07C 9/00111 455/41.2 |
| 8,261,090 B1 | 9/2012 | Matsuoka | |
| 9,104,886 B1* | 8/2015 | Dolbakian | G06F 21/62 |
| 2006/0210167 A1 | 9/2006 | Inoue et al. | |
| 2006/0220850 A1* | 10/2006 | Bowser | G08B 25/01 340/568.1 |
| 2010/0179874 A1* | 7/2010 | Higgins | G06K 9/00664 705/14.53 |
| 2012/0081392 A1 | 4/2012 | Arthur | |
| 2012/0246739 A1* | 9/2012 | Mebed | G06F 21/00 726/28 |
| 2012/0295708 A1 | 11/2012 | Hernandez-Abrego et al. | |
| 2013/0005443 A1 | 1/2013 | Kosta et al. | |
| 2013/0182918 A1* | 7/2013 | Kovtun | G06K 9/00288 382/118 |
| 2013/0265218 A1 | 10/2013 | Moscarillo | |
| 2013/0307766 A1* | 11/2013 | Amathnadu | G06F 3/017 345/156 |
| 2014/0033299 A1 | 1/2014 | McGloin et al. | |
| 2014/0115690 A1 | 4/2014 | Huang et al. | |
| 2014/0366159 A1* | 12/2014 | Cohen | G06F 21/31 726/28 |
| 2015/0003691 A1* | 1/2015 | Joo | G06K 9/00604 382/117 |
| 2015/0148011 A1* | 5/2015 | Chen | H04L 51/04 455/412.2 |
| 2015/0302207 A1* | 10/2015 | Sprenger | G06F 11/30 726/26 |

OTHER PUBLICATIONS

Liu, et al., "Data Protection System Based on User Input Patterns on Device", U.S. Appl. No. 14/400,529, 48 pages.
Liu, et al., "System for Data Protection in Power Off Mode", U.S. Appl. No. 14/400,528, 51 pages.
Liu, et al., "Data Protection Based on User Input During Device Boot-Up, User Login, and Device Shut-Down States", unfiled US Patent Application, 60 pages.
Liu, et al., "Fast Data Protection using Dual File Systems", U.S. Appl. No. 14/401,062, 49 pages.
International Search Report and Written Opinion Issued for PCT Patent Application No. PCT/CN2014/080944, Mailed Date: Mar. 27, 2015, 16 Pages.

* cited by examiner

DATA PROTECTION BASED ON USER AND GESTURE RECOGNITION

This application is a U.S. national phase of International Application No. PCT/CN2014/080944 filed Jun. 27, 2014, which designated the U.S. and is incorporated by reference herein in its entirety.

BACKGROUND

Increasingly more data is being stored on devices, particularly mobile devices. For instance, people may store personal data, and employees may store corporate data, governmental data, client-related data, intellectual property, and/or other sensitive forms of data on their devices. This sensitive data is put at risk when a device is lost, stolen, or compromised in some other manner.

To address this issue, techniques have been developed to protect sensitive data on devices. Conventional device data protection techniques typically rely on some form of user authentication, encryption, or a combination thereof. For example, a user may set up her device to require a particular password or PIN to be entered before data may be accessed on the device. Additionally, some devices enable users to encrypt files or folders stored thereon, which means that a code must be entered before a file can be viewed or copied. While such mechanisms can help protect sensitive data from unauthorized access, they are not foolproof. For example, a password mechanism will not work if the user is forced to give out her password against her will, or if the device is taken away while in active operation (i.e., after the user has already entered her password). Still other means may be used to overcome user authentication and encryption schemes. Once these data protection measures have been overcome, there is typically no way to protect the sensitive data from unauthorized access.

If a user determines that she is in a place where her device is likely to be stolen, she may be able to take active steps to protect the sensitive data. For example, the user may be able to input commands to the device to delete all the sensitive data therefrom. Depending upon the scenario, this may be necessary to protect the user's personal safety as well as the sensitive data. However, in many situations, the user will not be able to anticipate that her device will be stolen and thus will not take such steps. Even in situations where the user can anticipate a device theft, the user may not have sufficient time at her disposal to interact with her device to delete the sensitive data therefrom.

SUMMARY

A computing device is described herein that automatically enters a data protection mode in response to determining that a certain number of persons are located proximate to the computing device, that an owner or authorized user is not located proximate to the computing device, or that a certain user gesture has or has not been recognized. When the device enters the data protection mode, sensitive data stored on the device is automatically rendered invisible and/or inaccessible to a user thereof. The sensitive data may be rendered invisible and/or inaccessible in a manner that is not likely to be apparent to the user of the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
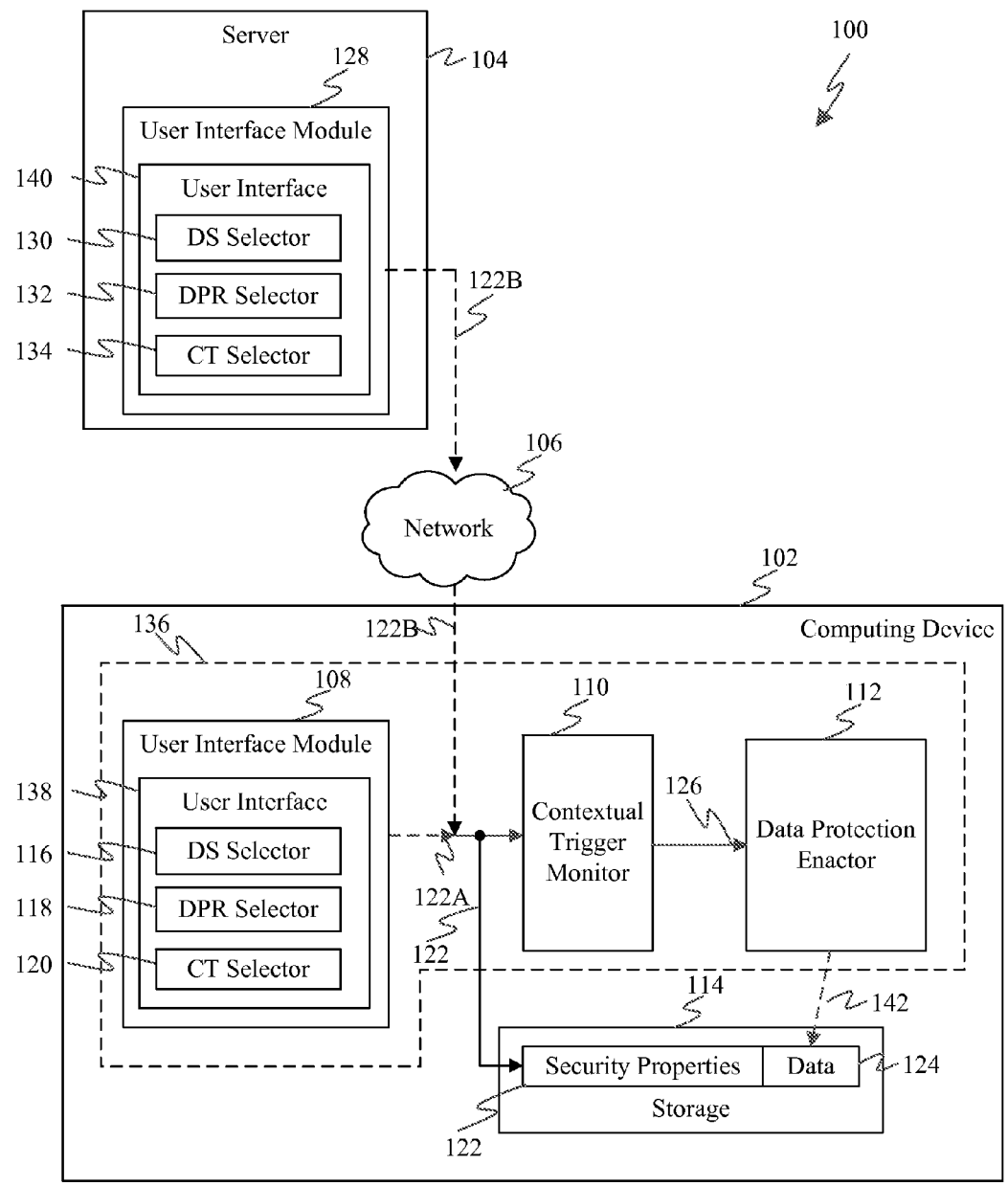
FIG. 1 is a block diagram of a data protection environment that includes a data protection system configured to protect data stored on a computing device, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

A computing device is described herein that automatically enters a data protection mode in response to determining that a certain number of persons are located proximate to the computing device, that an owner or authorized user is not located proximate to the computing device, or that a certain user gesture has or has not been recognized. When the device enters the data protection mode, sensitive data stored on the device is automatically rendered invisible and/or inaccessible to a user thereof. The sensitive data may be rendered invisible and/or inaccessible in a manner that is not likely to be apparent to the user of the computing device.

The foregoing features enable the computing device to automatically, quickly and discretely hide or delete sensitive data that is stored by the computing device when the computing device is in a risky environment. For example, the foregoing features may enable the computing device to automatically, quickly and discretely hide or delete sensitive data that is stored by the computing device when an owner or authorized user of the computing device is surrounded by strangers, when an owner or authorized user has stepped away from the computing device, when the computing device is in the possession of someone other than an owner or authorized user thereof, or when the owner or authorized user of the computing device has made or failed to make certain user gestures for triggering or not triggering a data protection mode of operation. Furthermore, since embodiments will still present non-sensitive data and otherwise function normally while operating in a data protection mode, any unauthorized or malicious users thereof may not be aware that data protection has been activated. By automatically, quickly and discretely hiding or deleting sensitive data in this manner, embodiments described herein can effectively protect sensitive data stored on the computing device as well as the personal safety of the owner or authorized user of the device.

Section II below describes exemplary data protection environments that include a computing device that implements contextually triggered data protection. Section III describes an exemplary embodiment in which a determination that a certain number of persons are located proximate to a computing device is used as a contextual trigger for data protection. Section IV describes an exemplary embodiment in which a determination that an owner or authorized user is not located proximate to a computing device is used as a contextual trigger for data protection. Section V describes an exemplary embodiment in which the fact that a certain user gesture has or has not been recognized by a computing device is used as a contextual trigger for data protection. Section VI describes example mobile and desktop device implementations of the computing device. Section VII provides some further example embodiments. Section VIII provides some concluding remarks.

II. Example Embodiments for Contextually Triggered Data Protection

Embodiments described herein enable protection of data stored on devices in a configurable and automatic manner based on context. Context-based data protection enables a user to set up policies to protect data on devices against undesired access, such as in situations where a device has been stolen, where the device is being used against the user's will (e.g., the user has been forced to give out the device password, the device has been taken away while in active operation, etc.), and in other situations. Predefined actions are automatically executed to protect the data when a risky external context is detected so as to prevent the data from being compromised.

Context-based data protection systems guard against access that is unintentionally or unwillingly authorized by users. Data is automatically protected from being compromised when a risky context is identified.

Embodiments for context-based data protection enforcement and execution architectures are provided. An enforcement architecture may be used to define data sensitivity levels (e.g., Level 1, Level 2, etc.), data protection responses (e.g., soft delete, hard delete, etc.), risk/trigger contexts (Context 1, Context 2), and a mapping between these elements (e.g., Level 1→Context 1→soft delete, which indicates that Level 1 content is to be soft deleted when Context 1 is detected). An execution architecture is configured to activate the predefined action/response to ensure the data is protected. Actions such as a "soft delete" can be recovered from, while a "hard delete" erases data completely without an option for recovery of the data. Data can also be hidden by causing it not to be retrieved in response to file system requests.

In embodiments, potential risky situations can arise in any device state, and techniques for the user to inform the system discretely or for the system to detect the situation automatically are provided. A context-based data protection architecture can be implemented and enforced with any one of or combination of the following control points:

Device in the powered off state: Enforcement can be accomplished by including an additional chipset (e.g., an additional processor, operating system, etc.) in the device to implement tamper detection.

Device in the boot-up state: The device can automatically boot into a data protection mode when a predefined key interrupt (e.g., a particular key combination, etc.) or other predetermined user input is not provided by the user.

Device in the user login state: An alternate password than the general device login password may need to be entered for a user account that is tied to data protection. The presence or absence of additional input and/or input behaviors during the user login process may also be detected and used to determine whether or not to activate data protection.

Device in the operation state:
  A physical location of the device can indicate possible threats.
  A camera of the device can detect a number of people facing the device within a particular distance to identify a risky environment.
  A device can be stolen or taken when it is in operation and not protected, and whether a user of the device is legitimate may be determined based on a user interface (UI) input pattern (e.g., a keyboard/finger touch area, size/mouse usage pattern, etc.).
  A device may be configured to detect a biometric signal of a user to determine a risk (e.g., login user is under duress and therefore data protection may be enacted discretely).

Device in the shut-down state: The device may be forced to shut down without the user's permission. In this case, when a shutdown password or other predetermined user input is not provided, a risk to data stored by the device may be identified.

In an example embodiment, data protection is configured for selected data on a device as follows. In an illustrative example used in the following several paragraphs, biometric information from a user of the device is configured as the contextual trigger for activating the data protection:

(A) The content to be protected, the context trigger, and the protection response are defined. For instance, the file(s) and/or the folder(s) defining the content to be protected are specified. The contextual trigger and the associated data protection policy are set for the content. Numerous different types of context triggers may selected, including those based on biometric information. For example, data protection context can be tied to a physical condition of the user (e.g., a user's heart rate, sweat level, facial expression, etc.). Unusual/abnormal operating values for the physical condition can be defined, as well as the associated action/response to take. (e.g., if heart rate>100 bpm→delete sensitive content.)

(B) The context of access to the content is monitored and recognized. There are many ways to detect the context depending on the particular context configuration. For example, with respect to biometric information, the device may detect an abnormal physical condition of the user and trigger the predefined action/response. Sensors (onboard and/or remote to the device) can monitor various physical conditions of the user, such as a distance of the user from the device, heart rate, sweat level, temperature, blood pressure, etc.

(C) Various possible responses can be taken to protect the data in the event that the contextual trigger is detected. Examples of such data protection responses include one or more of: a hard delete, where data marked as sensitive is automatically deleted from the device without any option for recovery; a soft delete, such as where data marked as sensitive is protected by deleting links or file pointers to the data and storing the links or file pointers in a safe location without immediately overwriting the data; hiding the data by causing file system data requests that target sensitive data to be ignored; providing an alert to the user (e.g., a message, a sound, a visual alert, etc.); disabling a file from being opened; closing an opened window in which data is displayed or hiding such a window behind other windows, etc.

(D) If the data is soft deleted as a data protection response, the data may later be recovered by the operating system. Soft deletion may comprise, for example, deleting only links or file pointers to the data (e.g., files). In such an embodiment, the data can be recovered/restored by restoring the links or file pointers from a secure store. In one embodiment, the restoration of the data can be automatic, such as the next time that the user logs in with the correct password and correct password entering context. Alternatively, the restoration may be triggered by a correct password context.

In another embodiment, data protection is configured for selected data on a device as follows. In this embodiment, a location of the device is configured as the contextual trigger for activating the data protection:

(A) The content to be protected, the context trigger, and the protection response are defined. For instance, the file(s)/folder(s) defining the content to be protected are specified. The contextual trigger and the associated data protection policy are set for the content. A geographic location is set as the data protection context, such as by using geo-coordinates, a map, etc. For example, sensitive data may be configured to be (hard or soft) deleted or hidden when the device is in a specific country. A mapping between a data sensitivity level of the content, the context, and the data protection response is configured.

(B) A location of the device is determined. For instance, a current location of the device can be determined using one or more of GPS (global positioning system), a cellular network (e.g., if the device has a SIM card), an IP (Internet protocol) address of an HTTP proxy, etc. Alternatively, a future location of the device can be predicted based on a traveling path of the device (e.g., determined by tracking the location of the device over time). The future location of the device can also be determined by analyzing a calendar of the user on the device, if available (e.g., a location of an appointment), and/or can be determined in other ways.

(C) Various possible data protection responses can be enacted to protect the data in the event that the device is determined to be at the pre-determined location, or predicted to soon be at the pre-determined location. Examples of such data protection responses include those described elsewhere herein or otherwise known, such as an alert, hard delete, soft delete, hiding of data, etc.

(D) If the data is soft deleted as a data protection response, the data may later be recovered by the operating system. Such recovery of the data may be performed as described elsewhere herein or otherwise known.

Further description of data protection embodiments is provided in the following subsections. For instance, the immediately following subsection describes further embodiments for the configuring of protections on data, followed by a subsection that describes further embodiments for the triggering and enactment of data protection.

A. Example Embodiments for Configuring Data Protection

Data protection systems may be configured in various ways to protect data from undesired access, in embodiments. For instance, FIG. 1 is a block diagram of a data protection environment 100 that includes a data protection system 136 configured to protect data stored on a computing device 102, according to an example embodiment. As shown in FIG. 1, data protection environment 100 includes computing device 102 and a server 104. Computing device 102 and server 104 are communicatively coupled by a network 106. Data protection system 136 is included in computing device 102. In the embodiment of FIG. 1, data protection system 136 includes a user interface module 108, a contextual trigger monitor 110, a data protection enactor 112, and storage 114. Furthermore, server 104 includes a user interface module 128. The features of environment 100 are described as follows.

As shown in FIG. 1, data protection system 136 may be implemented in computing device 102. Note that in another embodiment, data protection system 136 may be implemented partially in computing device 102 and partially in server 104. For instance, user interface module 108, contextual trigger monitor 110, and data protection enactor 112 may be included in computing device 102. Alternatively, user interface module 108 may not be present in computing device 102, but instead, user interface module 128 of server 104 may be part of data protection system 136 along with contextual trigger monitor 110 and data protection enactor 112. In another embodiment, both of user interface modules 108 and 128 may be present and part of data protection system 136.

Computing device 102 may be any type of stationary or mobile computing device, including a mobile computer (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a wearable computing device (e.g., a smart watch, a head-mounted device including smart glasses such as Google® Glass™, etc.), a digital camera, or other type of mobile device, or a stationary computing device such as a desktop computer or PC (personal computer).

Storage 114 may include one or more of any type of storage medium/device that is suitable for storing data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium/device.

Data 124 shown stored in storage 114 may be any type of data, including one or more files, one or more folders, a combination of files and folders, and/or any other type of data structure and/or number of data structures. Although a single instance of data (data 124) is shown stored in storage 114, the single instance of data is shown in FIG. 1 for ease of illustration. It is to be understood that any number of instances of data may be stored in storage 114, with each instance being one or more files and/or folders of any size having corresponding security parameters configured as disclosed herein.

Examples of network 106 include a local area network (LAN), a wide area network (WAN), a personal area network (PAN), and/or a combination of communication networks, such as the Internet. For communications over network 106, computing device 102 and server 104 may each include a network interface (e.g., a network interface card (NIC), etc.), a wired or wireless interface, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, etc.

A user may interact with user interface module 108 (when present) at computing device 102, or may interact with user interface module 128 (when present) at server 104, to configure data protection for data stored by computing device 102, such as data 124 stored in storage 114. The user that configures the data protection may be an owner or other user of computing device 102, a system administrator (e.g., when computing device 102 is a device of an enterprise), or other person.

User interface module 108 at computing device 102 may be present as a convenient way for a user of computing device 102 to configure protection for data stored in computing device 102. User interface module 108 may be part of a data protection application stored on computing device 102 (e.g., a standalone desktop or mobile application, an "app" that is partially cloud-based, etc.), may be part of an operating system of computing device 102, or may be present and configured in computing device 102 in another manner.

When interacting with a user interface generated by user interface module 108, a user may be enabled to view data stored in storage 114, such as data 124, and select such data for data protection configuration. The user may interact with the user interface to configure data protection for data 124, and to cause the data protection configuration to be stored in association with data 124 as security properties 122.

In another embodiment, it may be desired to not have user interface module 108 in computing device 102. For instance, it may be determined to be a security weakness if any person who obtains and is able to log into computing device 102 has access to user interface 108, and therefore can configure (including remove) protections for data stored at computing device 102. In such an embodiment, user interface module 108 may not be present at computing device 102, and instead, user interface module 128 may be present at server 104 to be used to configure protection for data stored in computing device 102. For example, user interface module 128 may be part of a data protection application (or an operating system) installed on server 102 that is not network accessible, may be part of a network accessible application (e.g., a browser accessible application), or may be present and configured in server 104 in another manner.

When interacting with a user interface generated by user interface module 128 of server 104, a user may be enabled to view data stored by computing device 102 through network 106, such as data 124, and to select such data for data protection configuration. The user may interact with the user interface to configure data protection for data 124, and may cause the data protection configuration to be stored in association with data 124 as security properties 122.

Figure 2:
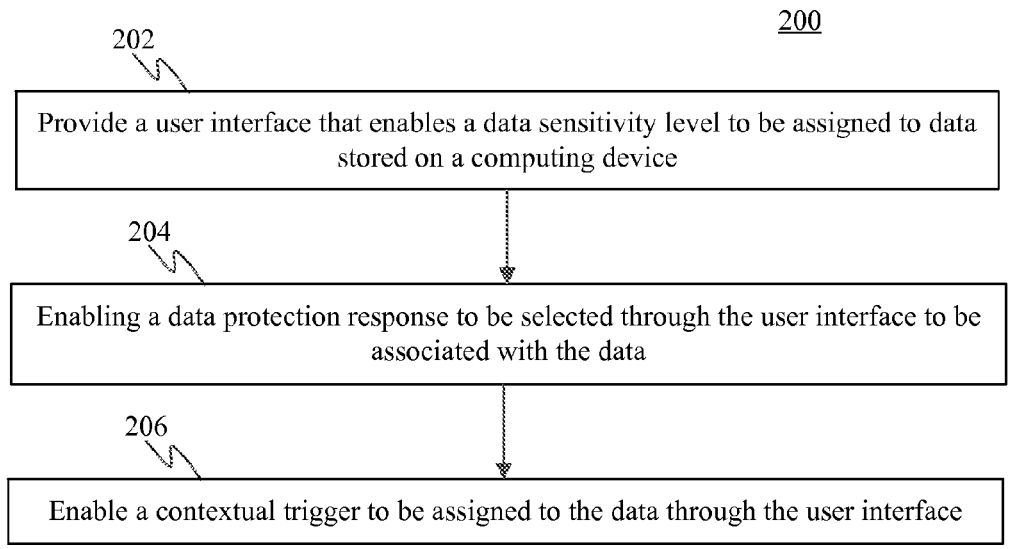
FIG. 2 depicts a flowchart of a process for configuring protection for stored data, according to an example embodiment.

User interface module 108 and/or user interface module 128 may be used to configure data protection in any manner, in embodiments. For instance, in an embodiment, user interface module 108 and/or user interface module 128 may operate in a manner illustrated in FIG. 2. FIG. 2 depicts a flowchart 200 of a process for configuring protection for stored data, according to an example embodiment. Flowchart 200 is described as follows with respect to FIG. 1.

Further structural and operational embodiments will be apparent to persons skilled in the relevant art(s) based on the following description.

Flowchart 200 begins with step 202. In step 202, a user interface is provided that enables a data sensitivity level to be assigned to data stored on a computing device. For example, as shown in FIG. 1, user interface module 108 (when present) may generate a user interface 138, and user interface module 128 (when present) may generate a user interface 140. User interface 138 and user interface 140 may each be any type of user interface that includes any number of user interface elements, including a graphical user interface, a touch interface, a voice control interface, a haptic interface, a gesture interface, etc.

In an embodiment, user interface 138 and/or user interface 140 may be provided to enable a data sensitivity level to be assigned to data stored on computing device 102, such as data 124. As shown in FIG. 1, user interface 138 includes a first data sensitivity (DS) selector 116, and user interface 140 includes a second DS selector 130. DS selector 116 and/or DS selector 130, depending on which is present, may be interacted with by a user to assign a data sensitivity level to data 124. For instance, DS selector 116 and/or DS selector 130 may be a user interface element such as a checkbox, a toggle switch, a button, a pull down menu, or another user interface element. The user may interact with the user interface element to select a data sensitivity for data 124. For example, a user may interact with DS selector 116 or DS selector 130 to designate selected data as either sensitive or non-sensitive. In an embodiment, a user may also interact with DS selector 116 or DS selector 130 to designate selected data as having differing degrees of sensitivity (e.g., not sensitive, moderately sensitive, highly sensitive, etc.).

In step 204, a data protection response is enabled to be selected through the user interface to be associated with the data. In an embodiment, user interface 138 and/or user interface 140 may be provided to enable a data protection response to be assigned to data stored on computing device 102, such as data 124. The data protection response is to be enacted with regard to the data in the event that the data is determined to at least potentially be threatened with undesired or risky access (e.g., computing device 102 is misplaced, is potentially stolen, is known to have been stolen, is potentially being accessed by an unauthorized person, a user of computing device 102 is being forced to access the data, etc.).

As shown in FIG. 1, user interface 138 includes a first data protection response (DPR) selector 118, and user interface 140 includes a second DPR selector 132. DPR selector 118 and/or DPR selector 132, depending on which is present, may be interacted with by a user to assign a data protection response to data 124. For instance, DPR selector 118 and/or DPR selector 132 may be any type of user interface element disclosed herein or otherwise known. The user may interact with the user interface element to select a data protection response for data 124. Various types of data protection responses may be available for selection and assignment to data 124.

Figure 3:
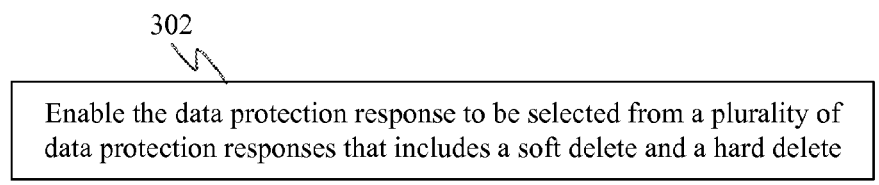
FIG. 3 depicts a flowchart of a process for selecting a data protection response for data, according to an example embodiment.

For instance, in an embodiment, step 204 of flowchart 200 may comprise a process shown in FIG. 3. FIG. 3 depicts a step 302 for selecting a data protection response for data, according to an example embodiment. In step 302, the data protection response is enabled to be selected from a plurality of data protection responses that includes a soft delete and a hard delete. Thus, in an embodiment, DPR selector 118 and/or DPR selector 132 may provide a list of data protection responses, and one or more of the data protection responses may be selected from the list and assigned to the data (e.g., by a pull down menu, checkboxes, etc.). The data protection response may comprise hard deleting the data or soft deleting the data. As will be discussed in more detail herein, a "hard delete" comprises rendering data permanently inaccessible (e.g., overwriting the data in memory/storage), while a "soft delete" comprises rendering the data temporarily inaccessible (e.g., by deleting links or file pointers to the data) such that it may be recovered at a subsequent time. Another example data protection response may comprise hiding the data by causing file system requests for the data to be ignored.

Figure 4:
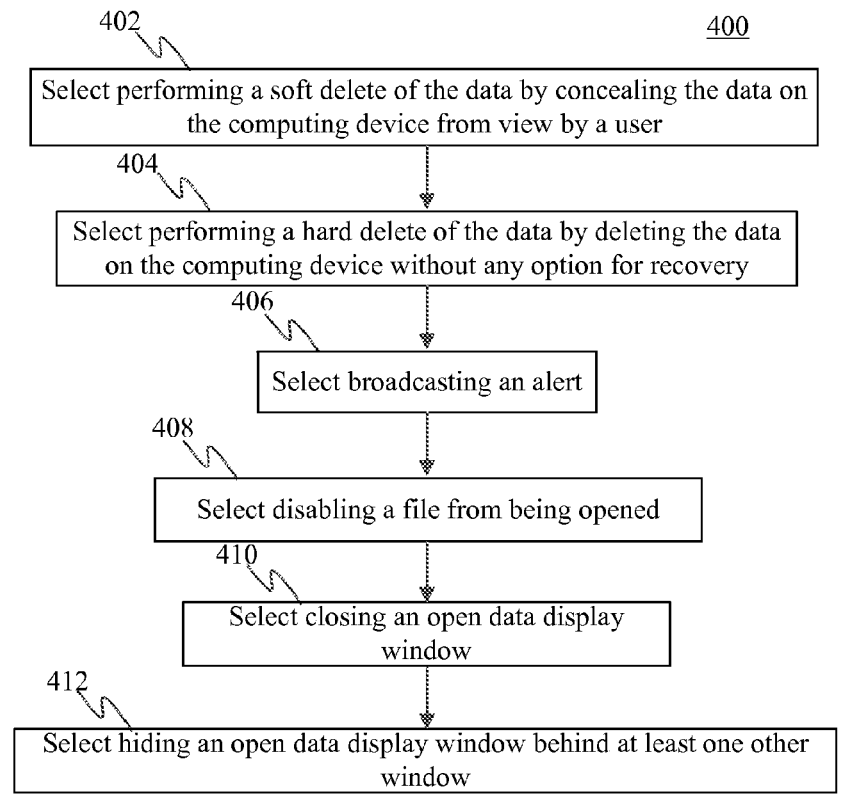
FIG. 4 depicts a flowchart of a process for selecting one or more different data protection responses, according to an example embodiment.

Further types of data protection responses may be selected from. For instance, FIG. 4 depicts a flowchart 400 of a process for selecting one or more different data protection responses, according to an example embodiment. Each step of flowchart 400 describes the selection of a separate and independent data protection response. Any one or more of the data protection responses described in flowchart 400 may be selected and assigned to a particular instance of data. Flowchart 400 is described as follows. Further structural and operational embodiments will be apparent to persons skilled in the relevant art(s) based on the following description.

Flowchart 400 begins with step 402. In step 402, a soft delete data protection response is selected. As described above, DPR selector 118 and/or DPR selector 132 may provide an option for a soft delete to be assigned as a data protection response for data. According to a soft delete, the data is concealed on computing device 102 from view by a user. For instance, links or file pointers to a file that represents the data may be deleted, and the links or file pointers may be stored in a location considered safe for possible later recovery/restoration.

In step 404, a hard delete data protection response is selected. As described above, DPR selector 118 and/or DPR selector 132 may provide an option for a hard delete to be assigned as a data protection response for data. According to a hard delete, the data is deleted from storage (e.g., storage 114) in a manner that the data cannot be recovered or restored. For instance, the storage location where the data was stored may be overwritten.

In step 406, an alert data protection response is selected. In an embodiment, DPR selector 118 and/or DPR selector 132 may provide an option for an alert to be assigned as a data protection response for data. An alert may be configured to notify an authorized user of computing device 102 (e.g., the owner, a system administrator, etc.) that the data may be threatened with unauthorized access. The alert may be delivered/transmitted to an address of phone number of the authorized user, or presented in another form, including as an email message, a text message, a social network message, a phone call, a beeping noise (or other sound), etc.

In step 408, a data protection response is selected that disables a file from being opened. In an embodiment, DPR selector 118 and/or DPR selector 132 may provide an option for disabling one or more files (representing data) from being opened as a data protection response for the data. The file(s) may be disabled from being opened in any manner, including by locking the file(s), increasing permissions on the file(s) (above the access rights of the user), etc.

In step 410, a data protection response is selected that causes an open data display window to be closed. In an embodiment, DPR selector 118 and/or DPR selector 132 may provide an option for closing an open display window that displays data as a data protection response for the data.

In step 412, a data protection response is selected that causes an open data display window to be hidden behind at least one other window. In an embodiment, DPR selector 118 and/or DPR selector 132 may provide an option for hiding an open display window behind one or more other windows as a data protection response for the data. For instance, the data display window may be moved behind one or more other windows that are already open, and/or one or more new windows may be opened in front of the data display window.

Note that, as described herein, DPR selector 118 and/or DPR selector 132 may be interacted with to assign a data protection response to data. In another embodiment, a data protection response may be pre-associated with a data sensitivity, and when the data sensitivity level is assigned to particular data, the associated data protection response is also assigned to the data. For instance, a soft delete may be associated with a low data sensitivity level, and a hard delete may be associated with a high data sensitivity level. If a low sensitivity level is assigned to particular data (in step 202 of flowchart 200), the soft delete is also automatically assigned to the particular data (in step 204).

Referring back to FIG. 2, in step 206, a contextual trigger is enabled to be assigned to the data through the user interface. In an embodiment, user interface 138 and/or user interface 140 may be provided to enable a contextual trigger to be assigned to data stored on computing device 102, such as data 124. The contextual trigger may be a condition or set of conditions that, when detected, indicate that computing device 102 has become subject or susceptible to an unauthorized access.

As shown in FIG. 1, user interface 138 includes a first contextual trigger (CT) selector 120, and user interface 140 includes a second CT selector 134. CT selector 120 and/or CT selector 134, depending on which is present, may be interacted with by a user to set a contextual trigger, the detection of which causes a data protection mode to be activated by data protection enactor 112. For instance, CT selector 120 and/or CT selector 134 may be any type of user interface element disclosed herein or otherwise known. The user may interact with the user interface element to select a contextual trigger for data 124. Examples of contextual triggers include but are not limited to: sensing that unauthorized users are in close proximity to computing device 102; tampering with computing device 102; the detected presence or absence of certain user input and/or user input behaviors during device boot-up, login, or shut down; and sensed behaviors of a user of computing device 102 indicating that the user is not an authorized user. A wide variety of other contextual triggers may be used as well.

As described above, the sensitivity level, data protection response, and contextual trigger may be selected for assignment to data 124. Selections of sensitivity level, data protection response, and contextual trigger made at computing device 102 are output from user interface module 108 as security properties 122A. Selections of sensitivity level, data protection response, and contextual trigger made at server 104 are output from user interface module 128 as security properties 122B, and are transmitted in a communication signal over network 106 to computing device 102. Security properties 122A or 122B may be stored in association with data 124 as security properties 122.

B. Example Embodiments for Triggering and Enacting Data Protection

Figure 5:
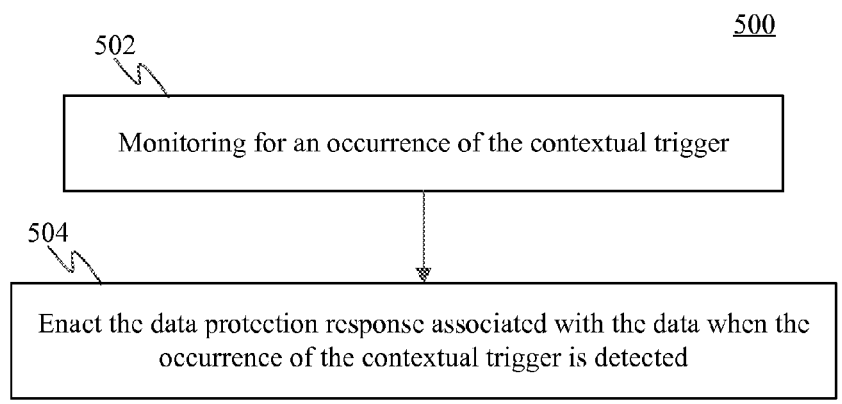
FIG. 5 depicts a flowchart of a process for monitoring a contextual trigger associated with data to trigger enactment of a data protection response, according to an example embodiment.

Data protection systems may be configured in various ways to monitor for data threatened with unauthorized access, and to enact data protection policies to protect the data. For instance, as described above with respect to FIG. 1, data protection system 136 in computing device 102 includes contextual trigger monitor 110 and data protection enactor 112. Contextual trigger monitor 110 and data protection enactor 112 are respectively configured to detect unauthorized access of data, and to enact data protection. Contextual trigger monitor 110 and data protection enactor 112 are described as follows with respect to FIG. 5. FIG. 5 depicts a flowchart 500 providing a process for monitoring a contextual trigger associated with data to trigger enactment of a data protection response, according to an example embodiment. Flowchart 500, contextual trigger monitor 110 and data protection enactor 112 are described as follows. Further structural and operational embodiments will be apparent to persons skilled in the relevant art(s) based on the following description.

Flowchart 500 begins with step 502. In step 502, an occurrence of the contextual trigger is monitored for. For example, as shown in FIG. 1, contextual trigger monitor 110 receives the contextual trigger(s) of security properties 122 associated with data 124. Contextual trigger monitor 110 may receive the contextual trigger(s) of security properties 122 directly from user interface module 108 and/or user interface module 128, or from storage 114. Contextual trigger monitor 110 operates over time to determine if any of the contextual trigger(s) have been detected. If contextual trigger monitor 110 determines that a contextual trigger has been detected, then contextual trigger monitor 110 notifies data protection enactor 112 by generating a trigger notification 126.

In step 504, the data protection response associated with the data is enacted when the occurrence of the contextual trigger is detected. In response to trigger notification 126, data protection enactor 112 may enact the data protection response(s) in security properties 122 associated with data 124. The enacted data protection response is illustrated as enacted action 142 in FIG. 1.

In embodiments, the data protection response in security properties 122 may indicate, and data protection enactor 112 may enact, any one or more data protection responses mentioned herein or otherwise known. For example, the data protection response may indicate and data protection enactor 112 may enact any one or more of the data protection responses described above in reference to flowchart 400 (FIG. 4) and described elsewhere herein, and/or any other suitable data protection responses that would be apparent to persons skilled in the relevant art(s) based on the teachings herein. Accordingly, data protection enactor 112 may include or access functionality for performing one or more data protection responses. For instance, data protection enactor 112 may include or access a file manager module capable of performing soft deletes of files and/or folders (which may include file encryption, file/folder moving and/or renaming, reconfiguring links to files/folders, etc.). Data protection enactor 112 may include or access a messaging module configured to send alert messages (e.g., a texting tool, an email tool, an instant messaging tool, a social network messaging tool, a phone communication tool, an audio tool, etc.). In another example, data protection enactor 112 may include or access a window management module (e.g., of an OS) capable of rearranging displayed windows and/or opening windows. Data protection enactor 112 may be configured with additional and/or alternative functionality for performing one or more data protection responses, as would be apparent to persons skilled in the relevant art(s) based on the teachings herein.

Figure 6:
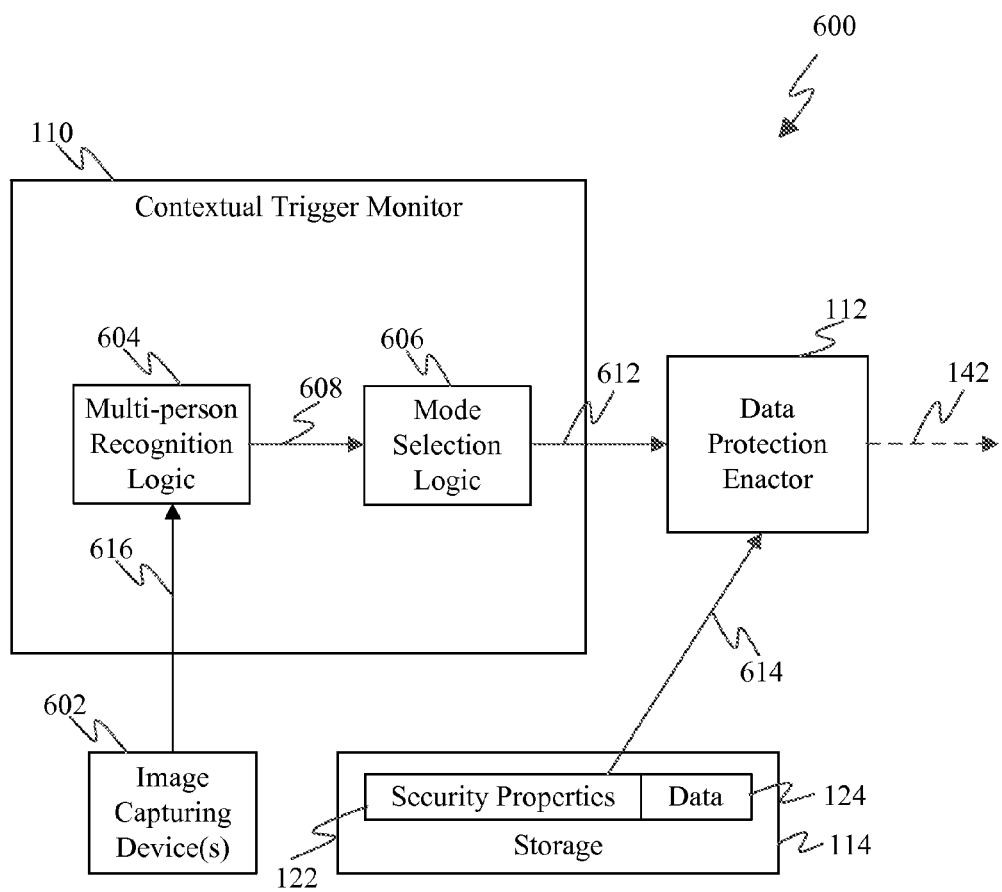
FIG. 6 is a block diagram of a data protection system configured to use a determined number of persons located proximate to a computing device as a contextual trigger for data protection, according to an example embodiment.

III. Example Contextual Triggers Based on Determination that a Certain Number of Persons are Located Proximate to Computing Device Contextual trigger monitor 110 may be configured in various ways to monitor for triggers indicating that data is exposed to or threatened with unauthorized access. For instance, FIG. 6 is a block diagram of a portion of a data protection system 600 that is configured to use as a contextual trigger a determination that a certain number of persons are located proximate to a computing device, according to an example embodiment. As shown in FIG. 6, data protection system 600 includes contextual trigger monitor 110 and data protection enactor 112. Furthermore, contextual trigger monitor 110 includes multi-user recognition logic 604 and mode selection logic 606. In an embodiment, contextual trigger monitor 110 may perform step 502 of flowchart 500 (FIG. 5), and data protection enactor 112 may perform step 504 of flowchart 500. Data protection system 600 is an example of the corresponding portion of data protection system 136 shown in FIG. 1, and for ease of illustration, not all features of system 600 are shown in FIG. 6. Data protection system 600 may be included in computing device 102. Data protection system 600 is described as follows.

In the embodiment of FIG. 6, contextual trigger monitor 110 is configured to use as a contextual trigger for data protection a determination that a certain number of persons are located proximate to a computing device. In accordance with the embodiment shown in FIG. 6, one or more image capturing devices 602 are integrated with computing device 102 or connected thereto via a suitable wired and/or wireless connection. Image capturing device(s) 602 operate to capture images of one or more areas around computing device 102. Image capturing device(s) 602 may comprise, for example, one or more light-sensitive cameras. However, this example is not intended to be limiting, and image capturing device(s) 602 may comprise other types of devices suitable for capturing 2D images, 3D images, or an image sequence, including but not limited to range sensors, tomography devices, radar devices, ultra-sonic cameras, or the like.

Image capturing device(s) 602 operate to capture one or more images which are represented in the form of image data 616. Such image data is passed to multi-person recognition logic 604. Multi-person recognition logic 604 analyzes image data 616 to determine a number of persons located proximate to computing device 102. For example, multi-person recognition logic 604 may apply a facial recognition algorithm to identify a number of distinct faces located proximate to computing device 102 based on image data 616. As another example, multi-person recognition logic 604 may apply a body recognition algorithm to identify a number of distinct bodies located proximate to computing device 102 based on image data 616.

In an embodiment, multi-person recognition logic 604 is configured to determine a number of persons located proximate to computing device 102 by analyzing image data 616 to determine a number of persons within a certain distance of computing device 102. For example, a number of persons located within 1 foot, 3 feet, 5 feet, 10 feet or any other specified distance of computing device 102 may be determined by multi-person recognition logic 604. In one embodiment, the distance is a fixed value (i.e., a value that is not configurable by a user). In an alternate embodiment, the distance is user-configurable value. In further accordance with such an embodiment, computing device 102 or server 104 may comprise a user interface module (e.g., user interface module 108 of computing device 102 or user interface module 128 of server 104) that is configured to provide a user interface by which a user can specify the particular distance within which the presence of persons is to be determined by multi-person recognition logic 604.

After multi-person recognition logic 604 has determined a number of persons located proximate to computing device 102, it passes such information as output 608 to mode selection logic 606. Mode selection logic 606 compares the number of persons located proximate to computing device 102 to a threshold value. In one embodiment, the threshold value is a fixed value (i.e., a value that is not configurable by a user). In an alternate embodiment, the threshold value is user-configurable value. In further accordance with such an embodiment, computing device 102 or server 104 may comprise a user interface module (e.g., user interface module 108 of computing device 102 or user interface module 128 of server 104) that is configured to provide a user interface by which a user can specify the threshold value.

Based on the results of comparing the number of persons located proximate to computing device 102 to the threshold value, mode selection logic 606 selectively activates one of a plurality of operating modes of computing device 102.

For example, in one embodiment, mode selection logic 606 operates as follows. If mode selection logic 606 determines that the number of persons located proximate to computing device 102 does not exceed the threshold value, then mode selection logic 606 activates a mode of operation in which sensitive and non-sensitive data stored on computing device 102 are both visible and accessible to the user. This essentially comprises a normal or "open" operating mode in which no data protection measures are enacted by data protection enactor 112.

In still further accordance with this embodiment, if mode selection logic 606 determines that the number of persons located proximate to computing device 102 does exceed the threshold value, then mode selection logic 606 activates a mode of operation in which non-sensitive data stored on computing device 102 is visible and accessible to the user but sensitive data stored on computing device 102 is rendered invisible and/or inaccessible to the user. This may involve sending a signal 612 to data protection enactor 112 that causes data protection enactor 112 to implement the various data protection responses assigned to the sensitive data stored on computing device 102. As was previously noted, such data protection responses may include but are not limited to hard deleting an item of sensitive data, soft deleting an item of sensitive data, causing file system requests for an item of sensitive data to be ignored, disabling an item of sensitive data from being opened and closing or hiding a window in which an item of sensitive data is displayed.

Data protection enactor 112 may enact the data protection responses in security properties 122 associated with data 124. As shown in FIG. 6, data protection enactor 112 receives a data protection response 614 from security properties 122 associated with data 124. Data protection response 614 indicates the one or more data protection responses to be performed by data protection enactor 112 if signal 612 received from mode selection logic 606 indicates that data protection is to be enacted for data 124.

The foregoing approach to data protection will now be described in reference to flowchart 700 of FIG. 7. In particular, FIG. 7 depicts a flowchart 700 of a process for enacting a data protection response for data based on a determined number of persons located proximate to a computing device, according to an example embodiment.

Figure 7:
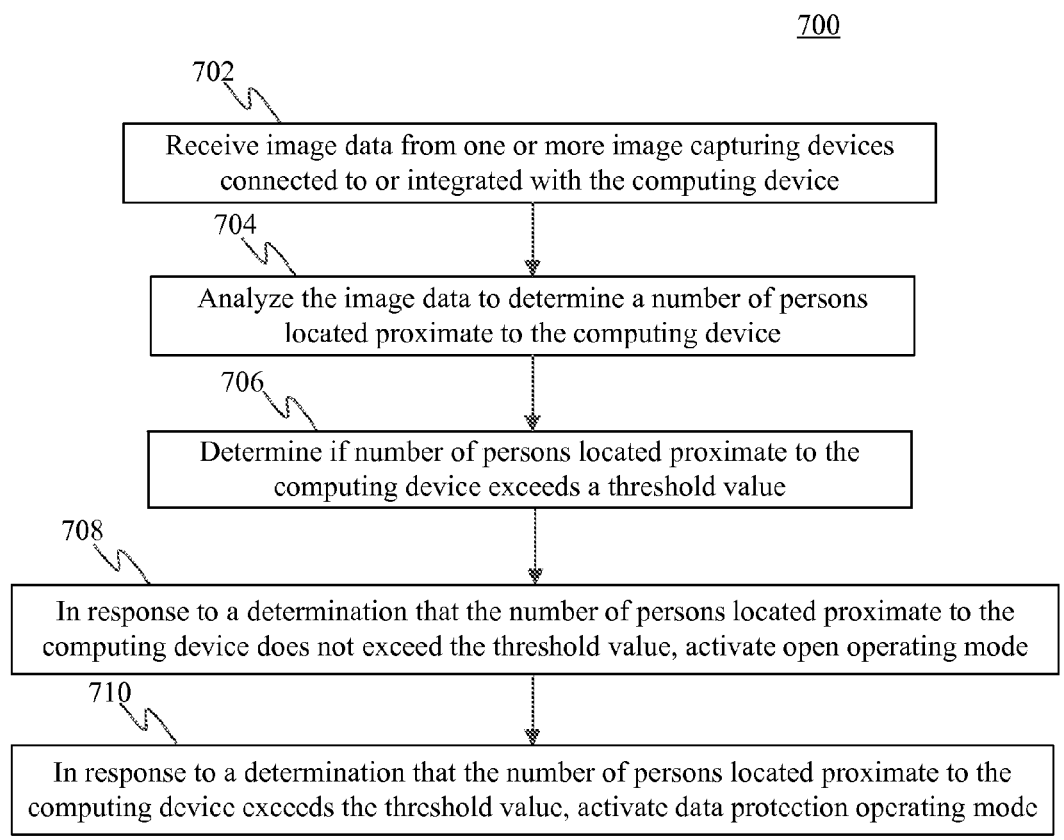
FIG. 7 depicts a flowchart of a process for enacting a data protection response for data based on a determined number of persons located proximate to a computing device, according to an example embodiment.

Referring to FIG. 7, the method of flowchart 700 begins with step 702. In step 702, image data is received from one or more image capturing devices connected to or integrated with the computing device. For instance, as described above, multi-person recognition logic 604 may receive image data 616 from image capturing device(s) 602 that are connected to or integrated with computing device 102.

In step 704, the image data is analyzed to determine a number of persons located proximate to the computing device. For instance, as described above, multi-person recognition logic 604 may analyze image data 616 to determine a number of persons located proximate to computing device 102. Multi-person recognition logic 604 may perform this step by analyzing image data 616 to identify a number of distinct faces, by analyzing image data 616 to identify a number of distinct bodies, and/or by using any other suitable image analysis technique for identifying multiple persons located proximate to computing device 102. Multi-person recognition logic 604 may further perform this step by analyzing image data 616 to determine a number of persons within a certain user-specified or system-specified distance of computing device 102.

In step 706, it is determined if the number of persons located proximate to the computing device exceeds a threshold value. For instance, as described above, multi-person recognition logic 604 may determine whether the number of persons located proximate to computing device 102 exceeds a system-specified or user-specified threshold value.

In step 708, in response to a determination that the number of persons located proximate to the computing device does not exceed the threshold value, an open operating mode is activated. For instance, in response to determining that the number of persons located proximate to computing device 102 does not exceed the threshold value, mode selection logic 606 may cause an open operating mode to be activated. The open operating mode may comprise a mode in which all sensitive and non-sensitive data stored on computing device 102 is visible and accessible to a user (i.e., a mode in which data protection responses have not been enacted by data protection enactor 112). Although this step refers to "activation" of the open operating mode, this step also encompasses continued operation in an open operating mode so long as the threshold value is not exceeded.

In step 710, in response to a determination that the number of persons located proximate to the computing device exceeds the threshold value, a data protection operating mode is activated. For instance, in response to determining that the number of persons located proximate to computing device 102 exceeds the threshold value, mode selection logic 606 may send signal 612 to data protection enactor 112 to cause data protection enactor 112 to enter computing device 102 into a data protection mode. As was previously described, during the data protection mode, data protection enactor 112 may implement the various data protection responses assigned to the sensitive data stored on computing device 102 to render such sensitive data invisible and/or inaccessible to a user. As was previously noted, such data protection responses may include but are not limited to hard deleting an item of sensitive data, soft deleting an item of sensitive data, causing file system requests for an item of sensitive data to be ignored, disabling an item of sensitive data from being opened and closing or hiding a window in which an item of sensitive data is displayed.

As was discussed above, during a data protection mode of operation, data protection enactor 112 may cause selected items of sensitive data (e.g., selected files and/or folders) to be soft deleted. Such soft deletion may comprise, for example, creating a secure backup copy of links or file pointers to the items of sensitive data (e.g., by storing an encrypted copy of the links or file pointers on computing device 102 or on a remote device) and then deleting such links or file pointers so that they are not accessible to an operating system and/or file system of computing device 102. In accordance with such an embodiment, the soft deleted data may be recovered by restoring the deleted links or file pointers from the secure backup copy to computing device 102. In one embodiment, sensitive data that is soft deleted as a result of the performance of step 710 of FIG. 7 may later be recovered when a user subsequently performs certain actions with respect to computing device 102 that indicates that soft deleted data should be recovered.

Figure 8:
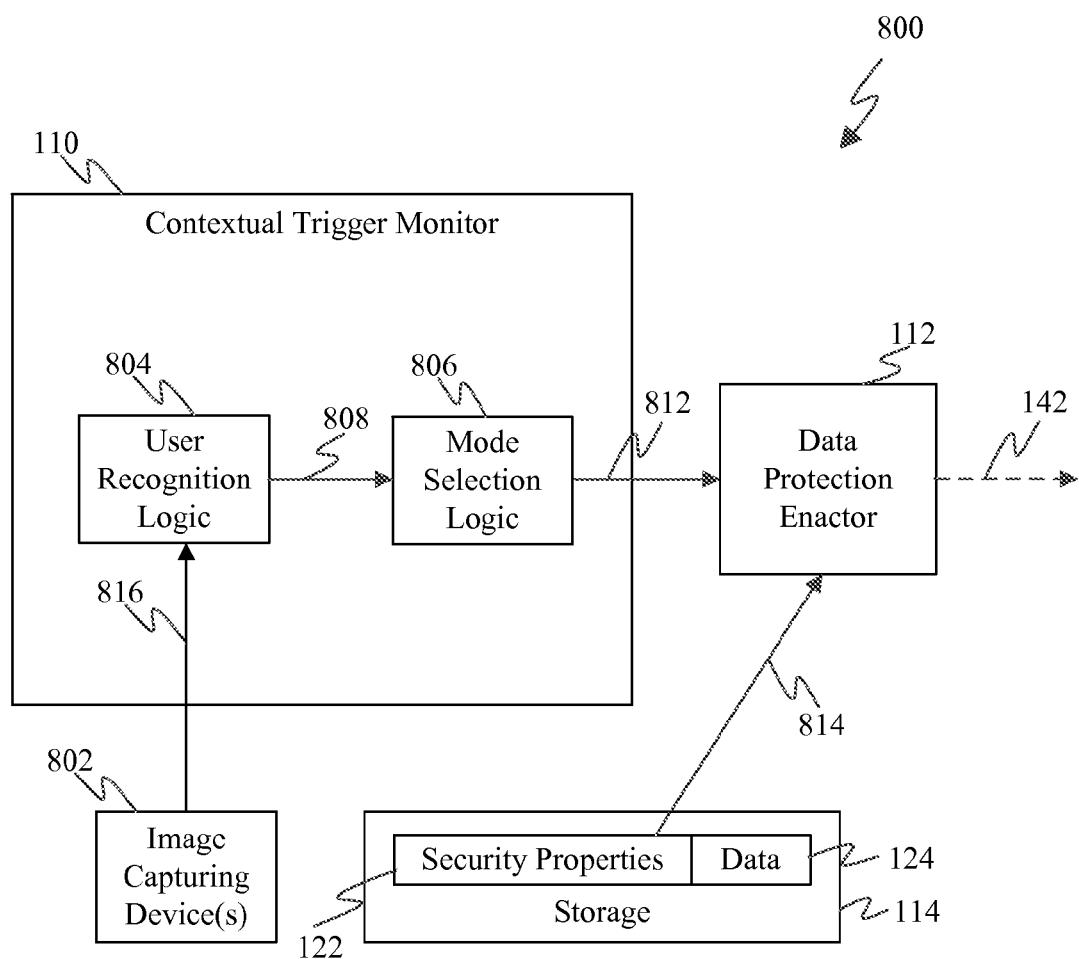
FIG. 8 is a block diagram of a data protection system configured to use a determination as to whether an owner or authorized user is located proximate to a computing device as a contextual trigger for data protection, according to an example embodiment.

IV. Example Contextual Triggers Based on Determination that an Owner or Authorized User is not Located Proximate to Computing Device Contextual trigger monitor 110 may be configured in various ways to monitor for triggers indicating that data is exposed to or threatened with unauthorized access. For instance, FIG. 8 is a block diagram of a portion of a data protection system 800 that is configured to use as a contextual trigger a determination that an owner or authorized user of a computing device is not located proximate to the computing device, according to an example embodiment. As shown in FIG. 8, data protection system 800 includes contextual trigger monitor 110 and data protection enactor 112. Furthermore, contextual trigger monitor 110 includes user recognition logic 804 and mode selection logic 806. In an embodiment, contextual trigger monitor 110 may perform step 502 of flowchart 500 (FIG. 5), and data protection enactor 112 may perform step 504 of flowchart 500. Data protection system 800 is an example of the corresponding portion of data protection system 136 shown in FIG. 1, and for ease of illustration, not all features of system 800 are shown in FIG. 8. Data protection system 800 may be included in computing device 102. Data protection system 800 is described as follows.

In the embodiment of FIG. 8, contextual trigger monitor 110 is configured to use as a contextual trigger for data protection a determination that an owner or authorized user of a computing device is not located proximate to the computing device. In accordance with the embodiment shown in FIG. 8, one or more image capturing devices 802 are integrated with computing device 102 or connected thereto via a suitable wired and/or wireless connection. Image capturing device(s) 802 operate to capture images of one or more areas around computing device 102. Image capturing device(s) 802 may comprise, for example, one or more light-sensitive cameras. However, this example is not intended to be limiting, and image capturing device(s) 802 may comprise other types of devices suitable for capturing 2D images, 3D images, or an image sequence, including but not limited to range sensors, tomography devices, radar devices, ultra-sonic cameras, or the like.

Image capturing device(s) 802 operate to capture one or more images which are represented in the form of image data 816. Such image data is passed to user recognition logic 804. User recognition logic 804 analyzes image data 816 to determine if an owner or authorized user of computing device 102 is located proximate to computing device 102. For example, user recognition logic 804 may apply a facial recognition algorithm to identify a face of an owner or authorized user located proximate to computing device 102 based on image data 816. As another example, user recognition logic 804 may apply a body recognition algorithm to identify a body of an owner or authorized user located proximate to computing device 102 based on image data 816. In certain embodiments, user recognition logic 804 may be trained to recognize the face and/or body of an owner or authorized user of computing device 102.

In an embodiment, user recognition logic 804 is configured to determine if an owner or authorized user of computing device 102 is located proximate to computing device 102 by analyzing image data 816 to determine if an owner or authorized user is within a certain distance of computing device 102. For example, whether an owner or authorized user is located within 1 foot, 3 feet, 5 feet, 10 feet or any other specified distance of computing device 102 may be determined by user recognition logic 804. In one embodiment, the distance is a fixed value (i.e., a value that is not configurable by a user). In an alternate embodiment, the distance is user-configurable value. In further accordance with such an embodiment, computing device 102 or server 104 may comprise a user interface module (e.g., user interface module 108 of computing device 102 or user interface module 128 of server 104) that is configured to provide a user interface by which a user can specify the particular distance within which the presence of an owner or authorized user is to be determined by user recognition logic 804.

After user recognition logic 804 has determined whether an owner or authorized user of computing device 102 is located proximate to computing device 102, it passes such information as output 808 to mode selection logic 806. Based on this information, mode selection logic 806 selectively activates one of a plurality of operating modes of computing device 102.

For example, in one embodiment, mode selection logic 806 operates as follows. If output 808 indicates that an owner or authorized user of computing device 102 is located proximate to computing device 102, then mode selection logic 806 activates a mode of operation in which sensitive and non-sensitive data stored on computing device 102 are both visible and accessible to the user. This essentially comprises a normal or "open" operating mode in which no data protection measures are enacted by data protection enactor 112.

In still further accordance with this embodiment, if output 808 indicates that an owner or authorized user of computing device 102 is not located proximate to computing device 102, then mode selection logic 806 activates a mode of operation in which non-sensitive data stored on computing device 102 is visible and accessible to the user but sensitive data stored on computing device 102 is rendered invisible and/or inaccessible to the user. This may involve sending a signal 812 to data protection enactor 112 that causes data protection enactor 112 to implement the various data protection responses assigned to the sensitive data stored on computing device 102. As was previously noted, such data protection responses may include but are not limited to hard deleting an item of sensitive data, soft deleting an item of sensitive data, causing file system requests for an item of sensitive data to be ignored, disabling an item of sensitive data from being opened and closing or hiding a window in which an item of sensitive data is displayed.

Data protection enactor 112 may enact the data protection responses in security properties 122 associated with data 124. As shown in FIG. 8, data protection enactor 112 receives a data protection response 814 from security properties 122 associated with data 124. Data protection response 814 indicates the one or more data protection responses to be performed by data protection enactor 112 if signal 812 received from mode selection logic 806 indicates that data protection is to be enacted for data 124.

The foregoing approach to data protection will now be described in reference to flowchart 900 of FIG. 9. In particular, FIG. 9 depicts a flowchart 900 of a process for enacting a data protection response for data based on a determination that an owner or authorized person is not located proximate to a computing device, according to an example embodiment.

Figure 9:
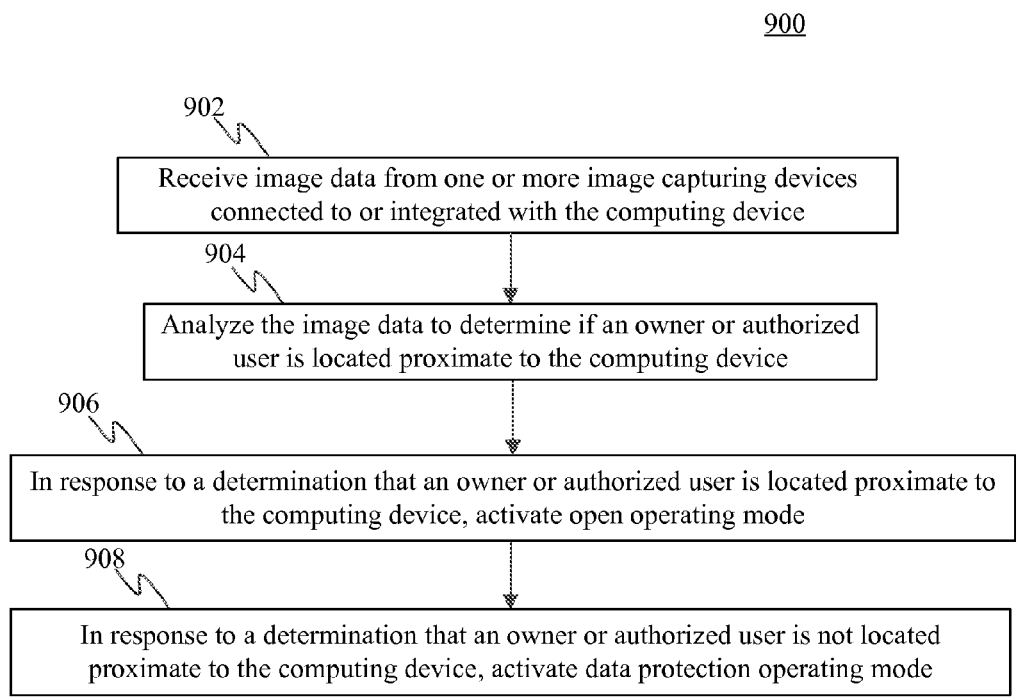
FIG. 9 depicts a flowchart of a process for enacting a data protection response for data based on a determination that an owner or authorized user is not located proximate to a computing device, according to an example embodiment.

Referring to FIG. 9, the method of flowchart 900 begins with step 902. In step 902, image data is received from one or more image capturing devices connected to or integrated with the computing device. For instance, as described above, user recognition logic 804 may receive image data 816 from image capturing device(s) 802 that are connected to or integrated with computing device 102.

In step 904, the image data is analyzed to determine if an owner or authorized user is located proximate to the computing device. For instance, as described above, user recognition logic 804 may analyze image data 816 to determine if an owner or authorized user of computing device 102 is located proximate to computing device 102. User recognition logic 804 may perform this step by analyzing image data 816 to identify or recognize a face of an owner or authorized user of computing device 102, by analyzing image data 816 to identify or recognize a body of an owner or authorized user of computing device 102, and/or by using any other suitable image analysis technique for identifying or recognizing an owner or authorized user of computing device 102 that is located proximate to computing device 102. User recognition logic 804 may further perform this step by analyzing image data 816 to determine if an owner or authorized user is within a certain user-specified or system-specified distance of computing device 102.

In step 906, in response to a determination that an owner or authorized user is located proximate to the computing device, an open operating mode is activated. For instance, in response to determining that an owner or authorized user is located proximate to the computing device, mode selection logic 806 may cause an open operating mode to be activated. The open operating mode may comprise a mode in which all sensitive and non-sensitive data stored on computing device 102 is visible and accessible to a user (i.e., a mode in which data protection responses have not been enacted by data protection enactor 112). Although this step refers to "activation" of the open operating mode, this step also encompasses continued operation in an open operating mode so long as the threshold value is not exceeded.

In step 908, in response to a determination that an owner or authorized user is not located proximate to the computing device, a data protection operating mode is activated. For instance, in response to determining that that an owner or authorized user is located proximate to computing device 102, mode selection logic 806 may send signal 812 to data protection enactor 112 to cause data protection enactor 112 to enter computing device 102 into a data protection mode. As was previously described, during the data protection mode, data protection enactor 112 may implement the various data protection responses assigned to the sensitive data stored on computing device 102 to render such sensitive data invisible and/or inaccessible to a user. As was previously noted, such data protection responses may include but are not limited to hard deleting an item of sensitive data, soft deleting an item of sensitive data, causing file system requests for an item of sensitive data to be ignored, disabling an item of sensitive data from being opened and closing or hiding a window in which an item of sensitive data is displayed.

As was discussed above, during a data protection mode of operation, data protection enactor 112 may cause selected items of sensitive data (e.g., selected files and/or folders) to be soft deleted. Such soft deletion may comprise, for example, creating a secure backup copy of links or file pointers to the items of sensitive data (e.g., by storing an encrypted copy of the links or file pointers on computing device 102 or on a remote device) and then deleting such links or file pointers so that they are not accessible to an operating system and/or file system of computing device 102. In accordance with such an embodiment, the soft deleted data may be recovered by restoring the deleted links or file pointers from the secure backup copy to computing device 102. In one embodiment, sensitive data that is soft deleted as a result of the performance of step 908 of FIG. 9 may later be recovered when a user subsequently performs certain actions with respect to computing device 102 that indicates that soft deleted data should be recovered.

Figure 10:
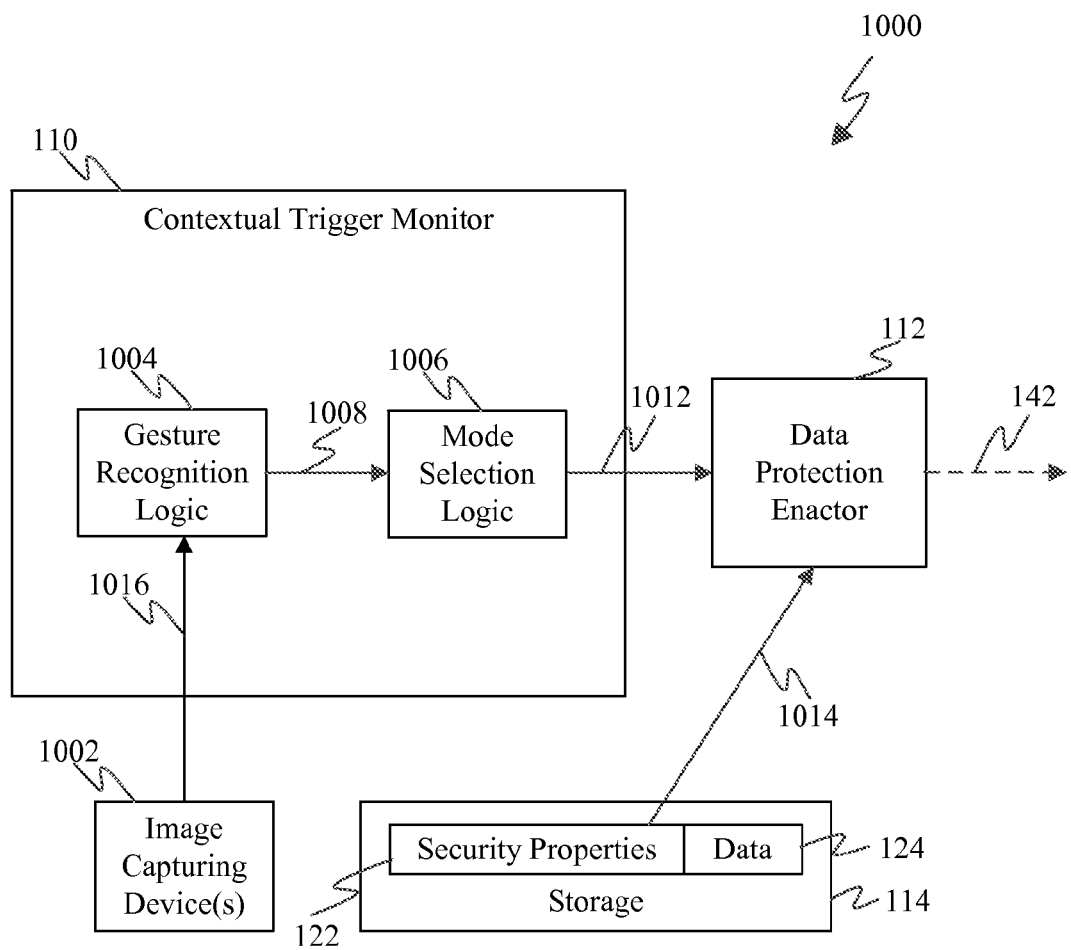
FIG. 10 is a block diagram of a data protection system configured to use the recognition of a user gesture or the absence of the recognition of a user gesture as a contextual trigger for data protection, according to an example embodiment.

V. Example Contextual Triggers Based on Detected Presence or Absence of Certain User Gestures Contextual trigger monitor 110 may be configured in various ways to monitor for triggers indicating that data is exposed to or threatened with unauthorized access. For instance, FIG. 10 is a block diagram of a portion of a data protection system 1000 that is configured to use as a contextual trigger the detected presence or absence of certain user gestures. As shown in FIG. 10, data protection system 1000 includes contextual trigger monitor 110 and data protection enactor 112. Furthermore, contextual trigger monitor 110 includes gesture recognition logic 1004 and mode selection logic 1006. In an embodiment, contextual trigger monitor 110 may perform step 502 of flowchart 500 (FIG. 5), and data protection enactor 112 may perform step 504 of flowchart 500. Data protection system 1000 is an example of the corresponding portion of data protection system 136 shown in FIG. 1, and for ease of illustration, not all features of system 1000 are shown in FIG. 10. Data protection system 1000 may be included in computing device 102. Data protection system 1000 is described as follows.

In the embodiment of FIG. 10, contextual trigger monitor 110 is configured to use as a contextual trigger for data protection a determination that a certain user gesture has or has not been recognized. In accordance with the embodiment shown in FIG. 10, one or more image capturing devices 1002 are integrated with computing device 102 or connected thereto via a suitable wired and/or wireless connection. Image capturing device(s) 1002 operate to capture images of one or more areas around computing device 102. Image capturing device(s) 1002 may comprise, for example, one or more light-sensitive cameras. However, this example is not intended to be limiting, and image capturing device(s) 1002 may comprise other types of devices suitable for capturing 2D images, 3D images, or an image sequence, including but not limited to range sensors, tomography devices, radar devices, ultra-sonic cameras, or the like.

Image capturing device(s) 1002 operate to capture one or more images which are represented in the form of image data 1016. Such image data is passed to gesture recognition logic 1004. Gesture recognition logic 1004 analyzes image data 1016 to determine if a particular user gesture has or has not been recognized. For example, user recognition logic 1004 may analyze image data 1016 to determine if a particular user facial gesture, hand gesture, arm gesture, body gesture, leg gesture, and/or foot gesture has or has not been recognized. In certain embodiments, the particular user gesture is fixed (i.e., a user gesture that is not configurable by a user). In an alternate embodiment, the user gesture is user-selectable or user-definable. In further accordance with such an embodiment, computing device 102 or server 104 may comprise a user interface module (e.g., user interface module 108 of computing device 102 or user interface module 128 of server 104) that is configured to provide a user interface by which a user can select or define the particular user gesture.

After gesture recognition logic 1004 has determined whether a particular gesture has or has not been recognized, it passes such information as output 1008 to mode selection logic 1006. Based on this information, mode selection logic 1006 selectively activates one of a plurality of operating modes of computing device 102.

For example, in one embodiment, mode selection logic 1006 operates as follows. If output 1008 indicates that a particular user gesture has been recognized, then mode selection logic 1006 activates a mode of operation in which sensitive and non-sensitive data stored on computing device 102 are both visible and accessible to the user. This essentially comprises a normal or "open" operating mode in which no data protection measures are enacted by data protection enactor 112.

In still further accordance with this embodiment, if output 1008 indicates that the particular user gesture has not been recognized, then mode selection logic 1006 activates a mode of operation in which non-sensitive data stored on computing device 102 is visible and accessible to the user but sensitive data stored on computing device 102 is rendered invisible and/or inaccessible to the user. This may involve sending a signal 1012 to data protection enactor 112 that causes data protection enactor 112 to implement the various data protection responses assigned to the sensitive data stored on computing device 102. As was previously noted, such data protection responses may include but are not limited to hard deleting an item of sensitive data, soft deleting an item of sensitive data, causing file system requests for an item of sensitive data to be ignored, disabling an item of sensitive data from being opened and closing or hiding a window in which an item of sensitive data is displayed.

In an alternate embodiment, mode selection logic 1006 operates as follows. If output 1008 indicates that a particular user gesture has not been recognized, then mode selection logic 1006 activates a mode of operation in which sensitive and non-sensitive data stored on computing device 102 are both visible and accessible to the user. This essentially comprises a normal or "open" operating mode in which no data protection measures are enacted by data protection enactor 112.

In still further accordance with this embodiment, if output 1008 indicates that the particular user gesture has been recognized, then mode selection logic 1006 activates a mode of operation in which non-sensitive data stored on computing device 102 is visible and accessible to the user but sensitive data stored on computing device 102 is rendered invisible and/or inaccessible to the user. This may involve sending a signal 1012 to data protection enactor 112 that causes data protection enactor 112 to implement the various data protection responses assigned to the sensitive data stored on computing device 102. As was previously noted, such data protection responses may include but are not limited to hard deleting an item of sensitive data, soft deleting an item of sensitive data, causing file system requests for an item of sensitive data to be ignored, disabling an item of sensitive data from being opened and closing or hiding a window in which an item of sensitive data is displayed.

The foregoing approach to data protection will now be described in reference to flowchart 1100 of FIG. 11. In particular, FIG. 11 depicts a flowchart 1100 of a process for enacting a data protection response for data based on a determination that a user gesture has or has not been recognized, according to an example embodiment.

Figure 11:
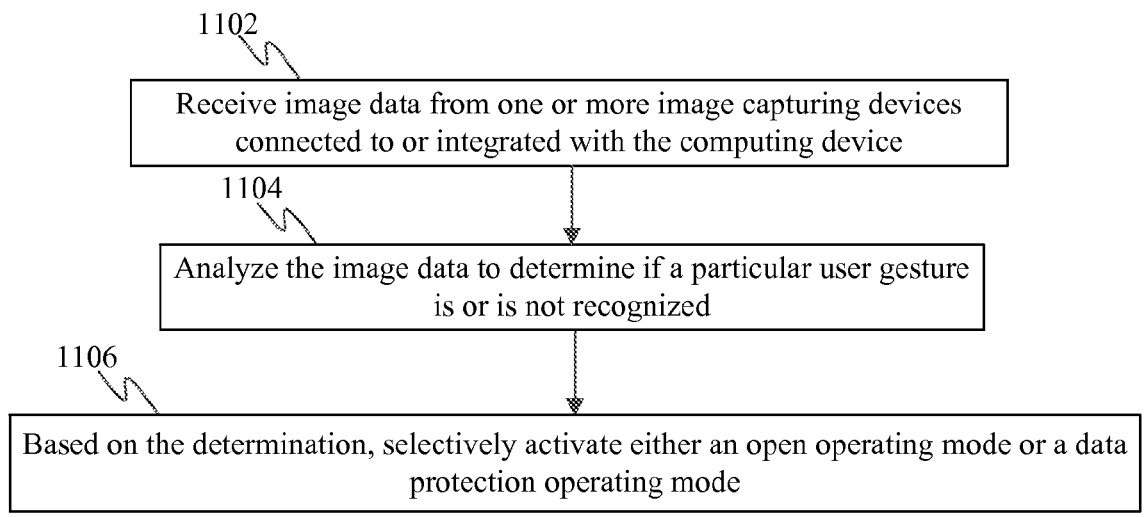
FIG. 11 depicts a flowchart of a process for enacting a data protection response for data based on the recognition of a user gesture or the absence of the recognition of a user gesture, according to an example embodiment.

Referring to FIG. 11, the method of flowchart 1100 begins with step 1102. In step 1102, image data is received from one or more image capturing devices connected to or integrated with the computing device. For instance, as described above, gesture recognition logic 1004 may receive image data 1016 from image capturing device(s) 1102 that are connected to or integrated with computing device 102.

In step 1104, the image data is analyzed to determine if a particular user gesture has or has not been recognized. For instance, as described above, user recognition logic 1004 may analyze image data 1016 to determine if a particular user gesture has or has not been recognized. Gesture recognition logic 1004 may perform this step by analyzing image data 1016 to determine whether a particular user facial gesture, hand gesture, arm gesture, body gesture, leg gesture, and/or foot gesture has or has not been recognized.

In step 1106, based on the determination made during step 1104, one of an open operating mode and a data protection operating mode is selectively activated. For instance, based on the determination made during step 1104, mode selection logic 1006 may selectively cause either an open operating mode to be activated or a data protection mode to be activated. The open operating mode may comprise a mode in which all sensitive and non-sensitive data stored on computing device 102 is visible and accessible to a user (i.e., a mode in which data protection responses have not been enacted by data protection enactor 112). Although this step refers to "activation" of the open operating mode, this step also encompasses continued operation in an open operating mode so long as the threshold value is not exceeded. The data protection operating mode may comprise a mode in which data protection enactor 112 implements the various data protection responses assigned to the sensitive data stored on computing device 102 to render such sensitive data invisible and/or inaccessible to a user. As was previously noted, such data protection responses may include but are not limited to hard deleting an item of sensitive data, soft deleting an item of sensitive data, causing file system requests for an item of sensitive data to be ignored, disabling an item of sensitive data from being opened and closing or hiding a window in which an item of sensitive data is displayed.

As was discussed above, during a data protection mode of operation, data protection enactor 112 may cause selected items of sensitive data (e.g., selected files and/or folders) to be soft deleted. Such soft deletion may comprise, for example, creating a secure backup copy of links or file pointers to the items of sensitive data (e.g., by storing an encrypted copy of the links or file pointers on computing device 102 or on a remote device) and then deleting such links or file pointers so that they are not accessible to an operating system and/or file system of computing device 102. In accordance with such an embodiment, the soft deleted data may be recovered by restoring the deleted links or file pointers from the secure backup copy to computing device 102. In one embodiment, sensitive data that is soft deleted as a result of the performance of step 1106 of FIG. 11 may later be recovered when a user subsequently performs certain actions with respect to computing device 102 that indicates that soft deleted data should be recovered.

VI. Example Mobile and Stationary Device Embodiments

Figure 12:
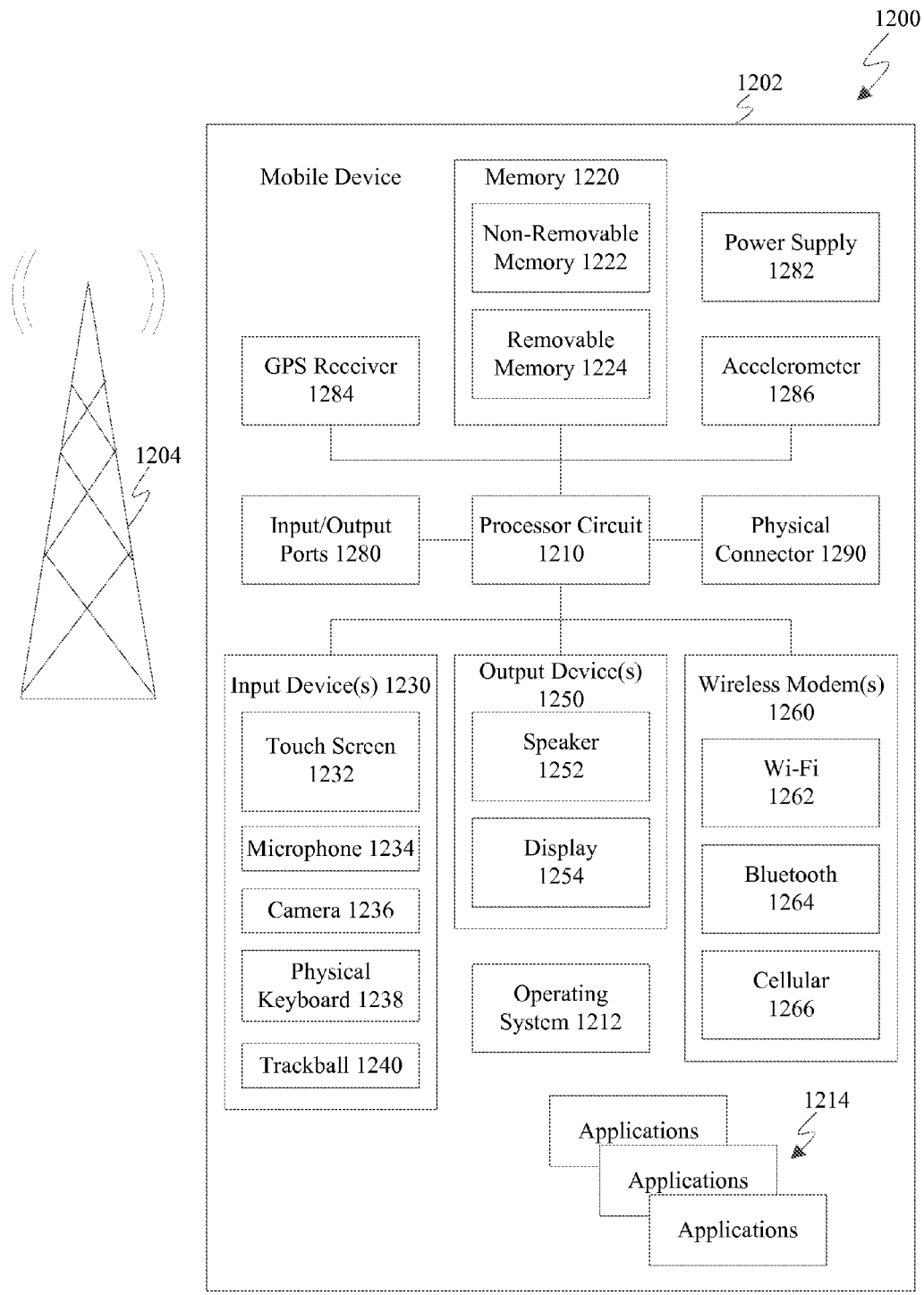
FIG. 12 is a block diagram of an exemplary mobile device that may be used to implement various embodiments described herein.

FIG. 12 is a block diagram of an exemplary mobile device 1202 that may be used to implement end user computing device 102 as described above in reference to FIG. 1. As shown in FIG. 12, mobile device 1202 includes a variety of optional hardware and software components. Any component in mobile device 1202 can communicate with any other component, although not all connections are shown for ease of illustration. Mobile device 1202 can be any of a variety of computing devices (e.g., cell phone, smartphone, handheld computer, Personal Digital Assistant (PDA), etc.) and can allow wireless two-way communications with one or more mobile communications networks 1204, such as a cellular or satellite network, or with a local area or wide area network.

The illustrated mobile device 1202 can include a processor circuit 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components of mobile device 1202 and support for one or more application programs 1214 (also referred to as "applications" or "apps"). Application programs 1214 may include common mobile computing applications (e.g., email, calendar, contacts, Web browser, and messaging applications) and any other computing applications (e.g., word processing, mapping, and media player applications). In one embodiment, operating system 1212 or an application program 1214 includes one of data protection management system 136 as described above in reference to FIG. 1, data protection management system 600 as described above in reference to FIG. 6, data protection management system 800 as described above in reference to FIG. 8, or data protection management system 1000 as described above in reference to FIG. 10.

The illustrated mobile device 1202 can include memory 1220. Memory 12320 can include non-removable memory 1222 and/or removable memory 1224. Non-removable memory 1222 can include RAM, ROM, flash memory, a hard disk, or other well-known memory devices or technologies. Removable memory 1224 can include flash memory or a Subscriber Identity Module (SIM) card, which is well known in GSM communication systems, or other well-known memory devices or technologies, such as "smart cards." Memory 1220 can be used for storing data and/or code for running operating system 1212 and applications 1214. Example data can include Web pages, text, images, sound files, video data, or other data to be sent to and/or received from one or more network servers or other devices via one or more wired or wireless networks. Memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. In an embodiment, memory 1220 includes storage 114.

Mobile device 1202 can support one or more input devices 1230, such as a touch screen 1232, a microphone 1234, a camera 1236, a physical keyboard 1238 and/or a trackball 1240 and one or more output devices 1250, such as a speaker 1252 and a display 1254. Touch screens, such as touch screen 1232, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens.

Other possible output devices (not shown) can include piezoelectric or other haptic output devices. Some devices can serve more than one input/output function. For example, touch screen 1232 and display 1254 can be combined in a single input/output device. The input devices 1230 can include a Natural User Interface (NUI).

Wireless modem(s) 1260 can be coupled to antenna(s) (not shown) and can support two-way communications between the processor 1210 and external devices, as is well understood in the art. The modem(s) 1260 are shown generically and can include a cellular modem 1266 for communicating with the mobile communication network 1204 and/or other radio-based modems (e.g., Bluetooth 1264 and/or Wi-Fi 1262). At least one of the wireless modem(s) 1260 is typically configured for communication with one or more cellular networks, such as a GSM network for data and voice communications within a single cellular network, between cellular networks, or between the mobile device and a public switched telephone network (PSTN).

Mobile device 1202 can further include at least one input/output port 1280, a power supply 1282, a satellite navigation system receiver 1284, such as a Global Positioning System (GPS) receiver, an accelerometer 1286 (as well as other sensors, including but not limited to a compass and a gyroscope), and/or a physical connector 1290, which can be a USB port, IEEE 1394 (FireWire) port, and/or RS-232 port. The illustrated components of mobile device 1202 are not required or all-inclusive, as any components can be deleted and other components can be added as would be recognized by one skilled in the art.

In an embodiment, certain components of mobile device 1202 are configured to perform any of the operations attributed to data protection management system 136 as described above in reference to FIG. 1, data protection management system 600 as described above in reference to FIG. 6, data protection management system 800 as described above in reference to FIG. 8, or data protection management system 1000 as described above in reference to FIG. 10. Computer program logic for performing the operations attributed to these components as described above may be stored in memory 1220 and executed by processor circuit 1210. By executing such computer program logic, processor circuit 1210 may be caused to implement any of the features of data protection management system 136 as described above in reference to FIG. 1, data protection management system 600 as described above in reference to FIG. 6, data protection management system 800 as described above in reference to FIG. 8, or data protection management system 1000 as described above in reference to FIG. 10. Also, by executing such computer program logic, processor circuit 1210 may be caused to perform any or all of the steps of any or all of the flowcharts depicted in FIGS. 2-5, 7, 9 and 11.

Figure 13:
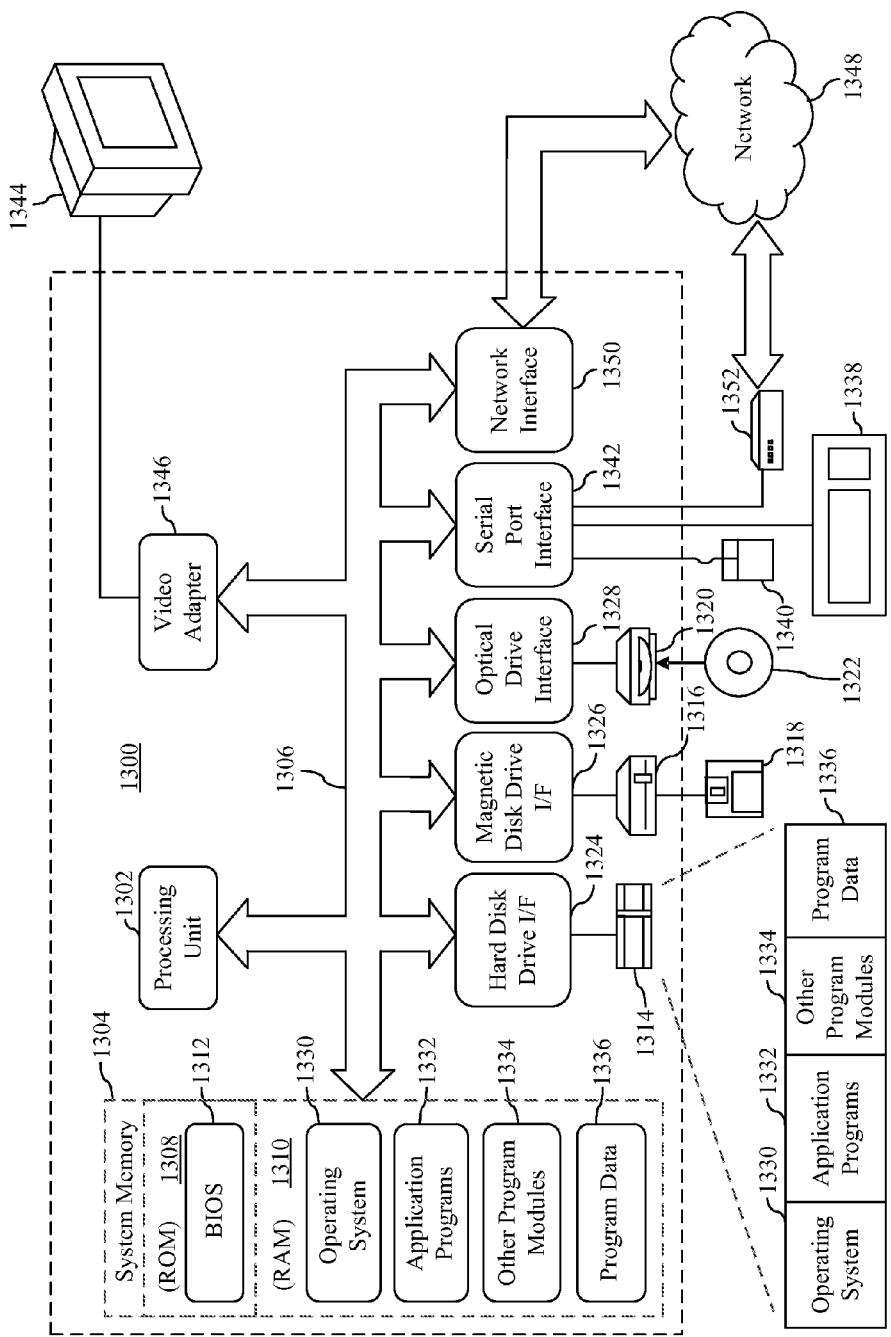
FIG. 13 is a block diagram of an example processor-based computer system that may be used to implement various embodiments described herein.

Furthermore, FIG. 13 depicts an example processor-based computer system 1300 that may be used to implement various embodiments described herein. For example, computer system 1300 may be used to implement end user computing device 102 or server 104 as described above in reference to FIG. 1. Computer system 1300 may also be used to implement any or all of the steps of any or all of the flowcharts depicted in FIGS. 2-5, 7, 9 and 11. The description of computer system 1300 set forth herein is provided for purposes of illustration, and is not intended to be limiting. Embodiments may be implemented in further types of computer systems, as would be known to persons skilled in the relevant art(s).

As shown in FIG. 13, computer system 1300 includes a processing unit 1302, a system memory 1304, and a bus 1306 that couples various system components including system memory 1304 to processing unit 1302. Processing unit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computer system 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, BLU-RAY™ disk or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1330, one or more application programs 1332, other program modules 1334, and program data 1336. In accordance with various embodiments, the program modules may include computer program logic that is executable by processing unit 1302 to perform any or all of the functions and features of data protection management system 136 as described above in reference to FIG. 1, data protection management system 600 as described above in reference to FIG. 6, data protection management system 800 as described above in reference to FIG. 8, or data protection management system 1000 as described above in reference to FIG. 10. The program modules may also include computer program logic that, when executed by processing unit 1302, performs any of the steps or operations shown or described in reference to the flowcharts of FIGS. 2-5, 7, 9 and 11.

A user may enter commands and information into computer system 1300 through input devices such as a keyboard 1338 and a pointing device 1340. Other input devices (not shown) may include a microphone, joystick, game controller, scanner, or the like. In one embodiment, a touch screen is provided in conjunction with a display 1344 to allow a user to provide user input via the application of a touch (as by a finger or stylus for example) to one or more points on the touch screen. These and other input devices are often connected to processing unit 1302 through a serial port interface 1342 that is coupled to bus 1306, but may be connected by other interfaces, such as a parallel port, game port, or a universal serial bus (USB). Such interfaces may be wired or wireless interfaces.

A display 1344 is also connected to bus 1306 via an interface, such as a video adapter 1346. In addition to display 1344, computer system 1300 may include other peripheral output devices (not shown) such as speakers and printers.

Computer system 1300 is connected to a network 1348 (e.g., a local area network or wide area network such as the Internet) through a network interface or adapter 1350, a modem 1352, or other suitable means for establishing communications over the network. Modem 1352, which may be internal or external, is connected to bus 1306 via serial port interface 1342.

As used herein, the terms "computer program medium," "computer-readable medium," and "computer-readable storage medium" are used to generally refer to memory devices or storage structures such as the hard disk associated with hard disk drive 1314, removable magnetic disk 1318, removable optical disk 1322, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1332 and other program modules 1334) may be stored on the hard disk, magnetic disk, optical disk, ROM, or RAM. Such computer programs may also be received via network interface 1350, serial port interface 1342, or any other interface type. Such computer programs, when executed or loaded by an application, enable computer system 1300 to implement features of embodiments of the present invention discussed herein. Accordingly, such computer programs represent controllers of computer system 1300.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, computer system 1400 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

VII. Example Embodiments

A system in accordance with an embodiment comprises at least one processor and one or more memory devices connected to the at least one processor. The one or more memory devices store software components for execution by the at least one processor. The software components include multi-person recognition logic and mode selection logic. The multi-person recognition logic is configured to receive image data from one or more image capturing devices connected to or integrated with a computing device and to analyze the image data to determine a number of persons located proximate to the computing device. The mode selection logic is configured to determine if the number of persons located proximate to the computing device exceeds a threshold value, to activate a first mode of operation of the computing device in response to a determination that the number of persons located proximate to the computing device does not exceed the threshold value, and to activate a second mode of operation of the computing device in response to determining that the number of persons located proximate to the computing device exceeds the threshold value. The first mode of operation of the computing device is a mode in which sensitive data stored on the computing device and non-sensitive data stored on the computing device are both visible and accessible to a user. The second mode of operation of the computing device is a mode in which the non-sensitive data stored on the computing device is visible and accessible to the user and the sensitive data stored on the computing device is rendered one or more of invisible to the user and inaccessible to the user.

In one embodiment of the foregoing system, the one or more image capturing devices comprise one or more cameras.

In another embodiment of the foregoing system, the multi-person recognition logic is configured to determine the number of persons located proximate to the computing device by analyzing the image data to identify a number of distinct faces.

In yet another embodiment of the foregoing system, the multi-person recognition logic is configured to determine the number of persons located proximate to the computing device by analyzing the image data to identify a number of distinct bodies.

In still another embodiment of the foregoing system, the software components further include a user interface module that is configured to provide a user interface by which a user can specify the threshold value.

In a further embodiment of the foregoing system, the multi-person recognition logic is configured to analyze the image data to determine the number of persons located proximate to the computing device by analyzing the image data to determine a number of persons within a certain distance of the computing device. In further accordance with such an embodiment, the software components may further include a user interface module that is configured to provide a user interface by which a user can specify the certain distance.

In a still further embodiment of the foregoing system, the second mode of operation of the computing device is a mode in which at least one item of sensitive data is rendered invisible to the user or inaccessible to the user by performing one or more of hard deleting the item of sensitive data, soft deleting the item of sensitive data, causing file system requests for the item of sensitive data to be ignored, disabling the item of sensitive data from being opened, and closing or hiding a window in which the item of data is displayed.

A method for protecting sensitive data stored on a computing device in accordance with an embodiment comprises (i) receiving image data from one or more image capturing devices connected to or integrated with the computing device; (ii) analyzing the image data to determine if an owner or authorized person is located proximate to the computing device; (iii) in response to a determination that the owner or authorized person is located proximate to the computing device, activating a first mode of operation of the computing device in which sensitive data stored on the computing device and non-sensitive data stored on the computing device are both visible and accessible to a user; and (iv) in response to a determination that the owner or authorized person is not located proximate to the computing device, activating a second mode of operation of the computing device in which the non-sensitive data stored on the computing device is visible and accessible to the user and the sensitive data stored on the computing device is rendered one or more of invisible to the user and inaccessible to the user.

In one embodiment of the foregoing method, the one or more image capturing devices comprise one or more cameras.

In another embodiment of the foregoing method, analyzing the image data to determine if the owner or authorized person is located proximate to the computing device comprises analyzing the image data to identify a face of the owner or authorized person.

In yet another embodiment of the foregoing method, analyzing the image data to determine if the owner or authorized person is located proximate to the computing device comprises analyzing the image data to identify a body of the owner or authorized person.

In still another embodiment of the foregoing method, analyzing the image data to determine if the owner of authorized person is located proximate to the computing device comprises analyzing the image data to determine if the owner or authorized person is within a certain distance of the computing device. In further accordance with such an embodiment, the method may further include providing a user interface by which a user can specify the certain distance.

In a further embodiment of the foregoing method, the second mode of operation of the computing device is a mode in which at least one item of sensitive data is rendered invisible to the user or inaccessible to the user by performing one or more of hard deleting the item of sensitive data, soft deleting the item of sensitive data, causing file system requests for the item of sensitive data to be ignored, disabling the item of sensitive data from being opened, or closing or hiding a window in which the item of data is displayed.

A computer program product in accordance with an embodiment comprises a computer-readable memory having computer program logic recorded thereon that when executed by at least one processor causes the at least one processor to perform a method for protecting sensitive data stored on a computing device. The method comprises receiving image data from one or more image capturing devices connected to or integrated with the computing device, analyzing the image data to determine whether a particular user gesture is recognized, and, based on the determination, selectively activating one of a first mode of operation of the computing device in which sensitive data stored on the computing device and non-sensitive data stored on the computing device are both visible and accessible to a user and a second mode of operation of the computing device in which the non-sensitive data stored on the computing device is visible and accessible to the user and the sensitive data stored on the computing device is rendered one or more of invisible to the user and inaccessible to the user.

In one embodiment of the foregoing computer program product, the one or more image capturing devices comprise one or more cameras.

In another embodiment of the foregoing computer program product, the particular gesture comprises one or more of a facial gesture, a hand gesture, an arm gesture, a body gesture, a leg gesture, and a foot gesture.

In yet another embodiment of the foregoing computer program product, the method further comprises providing a user interface by which a user can specify the particular gesture.

In still another embodiment of the foregoing computer program product, the second mode of operation of the computing device is a mode in which at least one item of sensitive data is rendered invisible to the user or inaccessible to the user by performing one or more of hard deleting the item of sensitive data, soft deleting the item of sensitive data, causing file system requests for the item of sensitive data to be ignored, disabling the item of sensitive data from being opened, and closing or hiding a window in which the item of data is displayed.

VIII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computing device, comprising:
at least one processor circuit configured to receive image data from one or more image capturing devices connected to or integrated with the computing device and to analyze the image data to determine a number of persons located proximate to the computing device; and
the at least one processor circuit being further configured to determine if the number of persons located proximate to the computing device exceeds a threshold value, to activate a first mode of operation of the computing device in response to a determination that the number of persons located proximate to the computing device does not exceed the threshold value, and to activate a second mode of operation of the computing device in response to a determination that the number of persons located proximate to the computing device exceeds the threshold value, the first mode of operation of the computing device being a mode in which sensitive data stored on the computing device and non-sensitive data stored on the computing device are both visible and accessible to a user, and the second mode of operation of the computing device being a mode in which the non-sensitive data stored on the computing device is visible and accessible to the user and the sensitive data stored on the computing device is rendered one or more of invisible to the user and inaccessible to the user, the second mode of operation being a mode in which at least one item of sensitive data is rendered invisible to the user or inaccessible to the user by performing one or more of:

hard deleting the item of sensitive data;

soft deleting the item of sensitive data; or causing file system requests for the item of sensitive data to be ignored.

2. The computing device of claim 1, wherein the one or more image capturing devices comprise one or more cameras.

3. The computing device of claim 1, wherein the at least one processor circuit is configured to determine the number of persons located proximate to the computing device by analyzing the image data to identify a number of distinct faces.

4. The computing device of claim 1, wherein the at least one processor circuit is configured to determine the number of persons located proximate to the computing device by analyzing the image data to identify a number of distinct bodies.

5. The computing device of claim 1, wherein the at least one processor circuit is further:

configured to provide a user interface by which a user can specify the threshold value.

6. The computing device of claim 1, wherein the at least one processor circuit is configured to analyze the image data to determine the number of persons located proximate to the computing device by:

analyzing the image data to determine a number of persons within a certain distance of the computing device.

7. The computing device of claim 6, wherein the at least one processor circuit is further:

configured to provide a user interface by which a user can specify the certain distance.

8. A method for protecting sensitive data stored on a computing device, comprising:

receiving image data from one or more image capturing devices connected to or integrated with the computing device;

analyzing the image data to determine if an owner or authorized person is located proximate to the computing device;

in response to a determination that the owner or authorized person is located proximate to the computing device, activating a first mode of operation of the computing device in which sensitive data stored on the computing device and non-sensitive data stored on the computing device are both visible and accessible to a user; and in response to a determination that the owner or authorized person is not located proximate to the computing device, activating a second mode of operation of the computing device in which the non-sensitive data stored on the computing device is visible and accessible to the user and the sensitive data stored on the computing device is rendered one or more of invisible to the user and inaccessible to the user, the second mode of operation of the computing device being a mode in which at least one item of sensitive data is rendered invisible to the user or inaccessible to the user by performing one or more of:

hard deleting the item of sensitive data;

soft deleting the item of sensitive data; or causing file system requests for the item of sensitive data to be ignored.

9. The method of claim 8, wherein the one or more image capturing devices comprise one or more cameras.

10. The method of claim 8, wherein analyzing the image data to determine if the owner or authorized person is located proximate to the computing device comprises:

analyzing the image data to identify a face of the owner or authorized person.

11. The method of claim 8, wherein analyzing the image data to determine if the owner or authorized person is located proximate to the computing device comprises:

analyzing the image data to identify a body of the owner or authorized person.

12. The method of claim 8, wherein analyzing the image data to determine if the owner of authorized person is located proximate to the computing device comprises:

analyzing the image data to determine if the owner or authorized person is within a certain distance of the computing device.

13. The method of claim 12, further comprising:

providing a user interface by which a user can specify the certain distance.

14. A computer program product comprising a computer-readable memory having computer program logic recorded thereon that when executed by at least one processor causes the at least one processor to perform a method for protecting sensitive data stored on a computing device, the method comprising:

receiving image data from one or more image capturing devices connected to or integrated with the computing device;

analyzing the image data to determine whether a particular user gesture is recognized; and based on the determination, selectively activating one of a first mode of operation of the computing device in which sensitive data stored on the computing device and non-sensitive data stored on the computing device are both visible and accessible to a user and a second mode of operation of the computing device in which the non-sensitive data stored on the computing device is visible and accessible to the user and the sensitive data stored on the computing device is rendered one or more of invisible to the user and inaccessible to the user, the second mode of operation of the computing device being a mode in which at least one item of sensitive data is rendered invisible to the user or inaccessible to the user by performing one or more of:

hard deleting the item of sensitive data;

soft deleting the item of sensitive data; or causing file system requests for the item of sensitive data to be ignored.

15. The computer program product comprising the computer-readable memory of claim 14, wherein the one or more image capturing devices comprise one or more cameras.

16. The computer program product comprising the computer-readable memory of claim 14, wherein the particular gesture comprises one or more of a facial gesture, a hand gesture, an arm gesture, a body gesture, a leg gesture, and a foot gesture.

17. The computer program product comprising the computer-readable memory of claim 14, wherein the method further comprises:
   providing a user interface by which a user can specify the particular gesture.

* * * * *